US009995450B2

(12) United States Patent
Geisler et al.

(10) Patent No.: US 9,995,450 B2
(45) Date of Patent: Jun. 12, 2018

(54) OPTICAL FILM STACK FOR LIGHT DUCT

(71) Applicant: 3M INNOVATIVE PROPERTIES COMPANY, St. Paul, MN (US)

(72) Inventors: Karl J. L. Geisler, Saint Paul, MN (US); Paul A. Nielsen, Lake Elmo, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 150 days.

(21) Appl. No.: 14/266,009

(22) Filed: Apr. 30, 2014

(65) Prior Publication Data
US 2015/0316221 A1 Nov. 5, 2015

(51) Int. Cl.
*F21S 11/00* (2006.01)
*G02B 5/04* (2006.01)
*G02B 5/28* (2006.01)

(52) U.S. Cl.
CPC .............. *F21S 11/007* (2013.01); *G02B 5/04* (2013.01); *G02B 5/045* (2013.01); *G02B 5/28* (2013.01); *G02B 5/285* (2013.01)

(58) Field of Classification Search
CPC .... G02B 6/4298; G02B 6/0096; G02B 5/045; G02B 5/285; G02B 5/28504; G02B 5/028; G02B 5/04; F21S 11/007; F21V 7/00; F21V 7/0008; F21V 7/0025; F21V 7/0033; F21V 7/005; F21V 7/0083
USPC ......... 359/591–595, 598; 362/560, 576, 331, 362/627, 217.01–217.17, 307–309, 311.11
See application file for complete search history.

(56) References Cited

U.S. PATENT DOCUMENTS

| | | | |
|---|---|---|---|
| 6,846,089 B2 | 1/2005 | Stevenson et al. |
| 7,327,517 B2 | 2/2008 | Senoue et al. |
| 7,374,328 B2 | 5/2008 | Kuroda et al. |
| 7,520,654 B2 | 4/2009 | Freking et al. |
| 8,249,408 B2 | 8/2012 | Coleman |
| 2005/0052737 A1 | 3/2005 | Amemiya et al. |

(Continued)

FOREIGN PATENT DOCUMENTS

| | | |
|---|---|---|
| JP | H07-161216 | 6/1995 |
| JP | 2000-314925 | 11/2000 |

OTHER PUBLICATIONS

PCT International Search Report for PCT/US2015/027758, dated Jul. 22, 2015.

(Continued)

*Primary Examiner* — Marin Pichler

(57) ABSTRACT

A film stack reflects incident light in some areas and transmits incident light in other areas, and it redirects incident light with one or more structured surfaces. The spatially variable reflection and transmission is achieved at least in part with reflective strips, and the reflective strips are attached to a first major surface of a structured optical film in the film stack. A second major surface of the structured optical film, opposite the first major surface, attaches to a substrate. The reflective strips attach to the structured optical film by a first discontinuous adhesive layer, having first adhesive areas. The structured optical film attaches to the substrate by a second discontinuous adhesive layer, having second adhesive areas. A major portion of the first adhesive areas, and a major portion of the second adhesive areas, is circumscribed by the reflective strips. The film stack may be part of a light duct.

22 Claims, 21 Drawing Sheets

(56) References Cited

U.S. PATENT DOCUMENTS

| | | | |
|---|---|---|---|
| 2007/0047261 A1* | 3/2007 | Thompson | G02B 6/0028 362/623 |
| 2008/0266501 A1* | 10/2008 | Freking | B32B 43/006 349/122 |
| 2009/0003016 A1* | 1/2009 | Ishimaru | G02B 6/0055 362/617 |
| 2011/0032449 A1 | 2/2011 | Freier et al. | |
| 2011/0236681 A1 | 9/2011 | Kim et al. | |
| 2011/0286222 A1* | 11/2011 | Coleman | B29D 11/0073 362/326 |
| 2012/0057350 A1 | 3/2012 | Freier et al. | |
| 2013/0335823 A1 | 12/2013 | Epstein et al. | |

OTHER PUBLICATIONS

U.S. Appl. No. 61/720,118, "Rectangular Light Duct Extraction", filed Oct. 30, 2012.
U.S. Appl. No. 61/720,124, "Curved Light Duct Extraction", filed Oct. 30, 2012.
U.S. Appl. No. 61/810,294, "Remote Illumination Light Duct", filed Apr. 10, 2013.
U.S. Appl. No. 61/918,371, "Modular Distribution System", filed Dec. 19, 2013.
U.S. Appl. No. 14/188,687, "Tubular Lighting Systems With Inner and Outer Structured Surfaces", filed Feb. 25, 2014.
U.S. Appl. No. 61/976,075, "Light Horn Arrays for Ducted Lighting Systems", filed Apr. 7, 2014.

\* cited by examiner

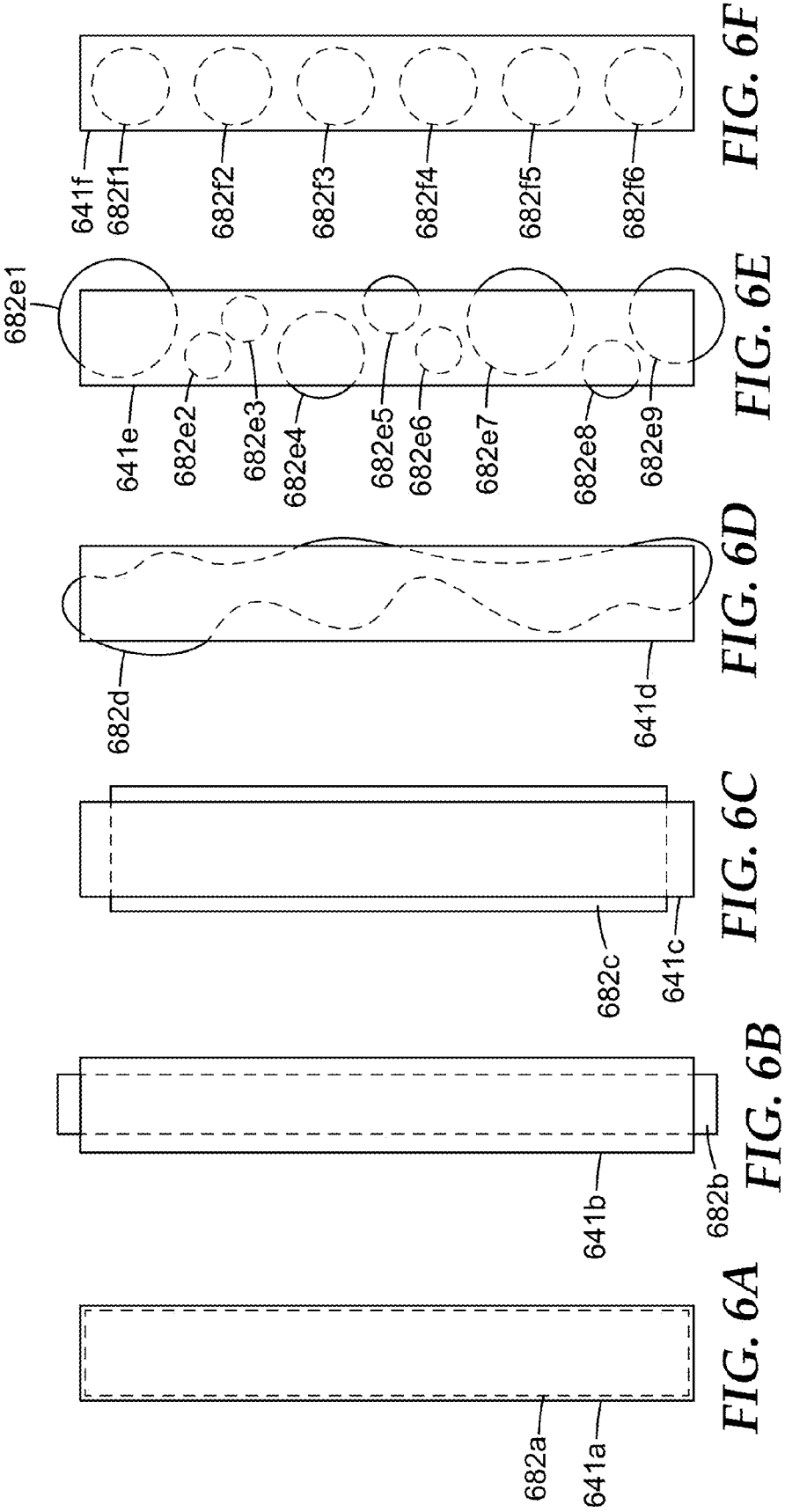

1230'

1230'

OPTICAL FILM STACK FOR LIGHT DUCT

BACKGROUND

The use of mirror-lined ducts for transporting visible light to provide general illumination, e.g. in a building or office environment, is known. Depending on the details of construction, such "light ducts" may provide: a large cross-sectional area and large numerical aperture, enabling larger fluxes with less concentration; a robust and clear propagation medium (i.e., air), for lower attenuation and longer lifetimes; and a potentially lower weight per unit of light flux transported, in comparison to fibers or solid light guides. Light ducts can also be used with remote light sources, such as the sun or known electrically powered light sources, to transport remotely generated light to an interior environment.

In some cases, the light duct may include a section that partially transmits and partially reflects light propagating in the duct. The partial transmission is to extract some of the light from the duct to provide exterior illumination. The partial reflection is to allow the remainder of the light in the duct to continue propagating to more distal portions of the duct. In some cases, the partially reflective/transmissive section utilizes a film stack that includes a perforated mirror film and a structured optical film.

SUMMARY

We have found that film stacks in which a perforated mirror film attaches to a structured optical film can present certain product design challenges. One such design challenge relates to production speed: the process of perforating the mirror film can be slow and time-consuming. Another design challenge relates to product efficiency: the process of perforating the mirror film can degrade or otherwise modify the mirror film along the edges of the perforations, such that a significant percentage of the mirror film associated with such edge portions neither transmits light in the same way as the perforations, nor reflects light in the same way as the undisturbed portions of the mirror film. Another design challenge arises when the film stack includes a second structured surface disposed behind (or in front of, depending on the point of view) the first structured surface and the perforated mirror film, and attached by an adhesive. To avoid rendering unobstructed portions of the second structured surface ineffective by applying adhesive to such portions, the adhesive should be applied only in selected areas that are obstructed by the mirror film (thus avoiding any locations corresponding to perforated areas of the mirror film), which may require difficult, tedious, and impractical registered printing of the adhesive, or the adhesive may be applied only near the outer edges of the second structured surface, such that a large central region of the second structured surface remains unattached and subject to wrinkling and warping.

We have also found that one, some, or all of these product design challenges can be overcome by slitting a mirror film (or other reflective film) into strips, or otherwise fabricating such reflective strips, and incorporating the strips into the film stack along with appropriately placed discontinuous adhesive layers and one or more structured surfaces. Slitting can produce the same or less degradation of the reflective film along the edge compared to perforating, and it can be carried out at much faster speeds. Registration of a discontinuous adhesive layer can also be achieved much more easily with elongated strips than with a 2-dimensional perforation pattern.

We have developed new types of film stacks or panels that reflect incident light in some areas, transmit incident light in other areas, and redirect incident light with one or more structured surfaces. The spatially variable reflection and transmission is achieved at least in part with reflective strips, and the reflective strips are attached to a first major surface of a structured optical film in the film stack. A second major surface of the structured optical film, opposite the first major surface, attaches to a substrate. The reflective strips attach to the structured optical film by a first discontinuous adhesive layer, having first adhesive areas. The structured optical film attaches to the substrate by a second discontinuous adhesive layer, having second adhesive areas. A major portion of the first adhesive areas is circumscribed by the reflective strips. Similarly, a major portion of the second adhesive areas is also circumscribed by the reflective strips. The film stack may be part of a light duct, or part of another optical device or system.

We therefore describe herein, among other things, film stacks that include a structured optical film, a plurality of reflective strips, a substrate, and a first and second discontinuous adhesive layer. The structured optical film may have opposed first and second major surfaces, at least one of the first and second major surfaces comprising a structured surface. The plurality of reflective strips may be attached to the first major surface, and the substrate may be attached to the second major surface. The first discontinuous adhesive layer, which contains first adhesive areas and first open areas, attaches the plurality of reflective strips to the first major surface. A major portion of the first adhesive areas may be circumscribed by the plurality of reflective strips. The second discontinuous adhesive layer, which contains second adhesive areas and second open areas, attaches the substrate to the second major surface. A major portion of the second adhesive areas may be circumscribed by the plurality of reflective strips.

Other aspects of the invention can be found in the appended claims and the detailed description that follows.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The accompanying drawings are incorporated in and constitute a part of this application and, together with the description, explain the principles and advantages of the invention. In the drawings.

FIGS. 6A through 6F are schematic plan views of a reflective strip and associated adhesive areas of a discontinuous adhesive layer;

In the figures, like reference numerals designate like elements.

DETAILED DESCRIPTION

As summarized above, we have developed a new class of optical film stacks in which some areas of the stack substantially reflect incident light, other areas of the stack substantially transmit incident light, and the stack also includes one or more structured surfaces to redirect incident light, e.g. by refraction and/or reflection at a multitude of angled facets. These optical film stacks can be made by any suitable process, but typically, at least some of the various optical films included in the stack can be made in separate manufacturing processes, and then attached to each other using adhesives and/or other attachment means to form a film laminate. For example, a high reflectivity optical film can be made by coextrusion of numerous alternating polymer layers followed by stretching, or by applying a thin vapor coat of aluminum or silver to a smooth polymer film. Separately, a structured optical film can be made by embossing a major surface of a polymer film, or by casting and curing a structured layer onto a carrier film. Such separately manufactured films may then be further processed, e.g., the high reflectivity film can be slit into elongated strips. The films may then be laminated together e.g. using adhesive material(s) or other suitable bonding agents, to form the film stack. Depending upon the mechanical characteristics of the constituent components of the film stack, the stack may be substantially rigid, stiff, and/or self-supporting—for example, if held at one end, the stack may substantially retain a planar or other initial shape without substantial drooping. In other embodiments, the stack may be flexible, limp, and/or not self-supporting.

Figure 1:
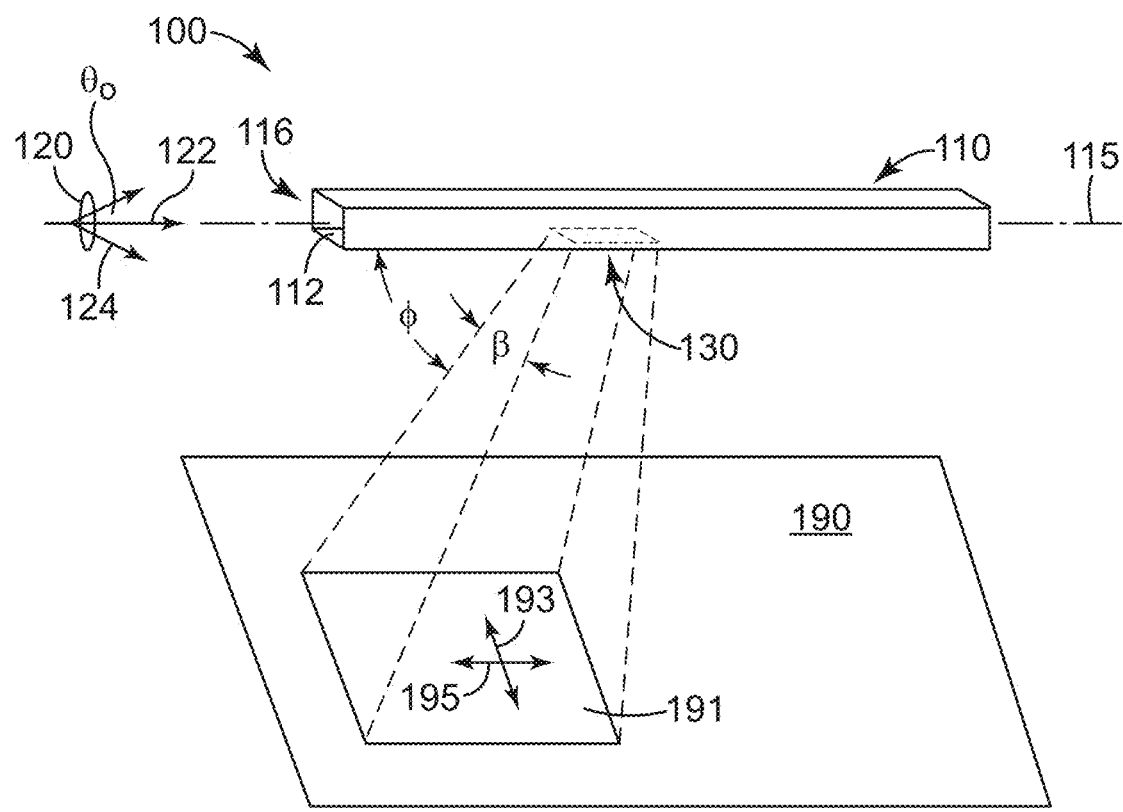
FIG. 1 is a schematic perspective view of a lighting system that includes a light duct.

The film stacks may be used as controlled output panels for light ducts. The controlled output panels allow some light to be extracted from the light duct, to provide exterior illumination, while also allowing some light to continue propagating down the light duct. Such a lighting system 100 is shown schematically in FIG. 1. The lighting system 100 includes a light duct 110 having a longitudinal axis 115 and a reflective inner surface 112 surrounding a cavity 116. A light source provides a partially collimated light beam 120 having a central light ray 122 and boundary light rays 124 disposed within a collimation half-angle $\theta_0$ of the longitudinal axis 115. This light beam 120 can be efficiently transported along the light duct 110. A portion of the partially collimated light beam 120 can leave the light duct 110 through a controlled output panel 130 where some of the light is extracted. In general, any desired number of controlled output panels can be disposed at different locations on any of the light ducts described herein. In the figure, for simplicity, only one such output panel is shown. The light rays exiting the output panel 130 are directed onto an illumination region 191 of an intercepting surface 190. By appropriate selection and configuration of optical films in the output panel 130 and light duct 110, the exiting light rays can be directed over a desired range of angles. By such selection and direction, the illumination region 191 can be positioned as desired on the intercepting surface 190, along a first direction 193 perpendicular to the longitudinal axis 115 and also along a second direction 195 parallel to the longitudinal axis 115. The size and shape of the illumination region 191 can also be tailored as desired, and can be characterized by a radial output angle β and a longitudinal output angle φ from the light duct 110, as shown in FIG. 1. The light rays exiting the output panel 130 can be configured to create a wide variety of desired levels and patterns of illumination on the illumination region 191.

The partially collimated light beam 120 may be substantially in the form of a cone of light characterized by an input light divergence angle $\theta_0$ (i.e., a collimation half-angle $\theta_0$) and a central light ray 122. The divergence angle $\theta_0$ of partially collimated light beam 120 can be symmetrically distributed in a cone around the central light ray 122, or it can be non-symmetrically distributed. In some cases, the divergence angle $\theta_0$ of partially collimated light beam 120 can range from 0 degrees to 30 degrees, or from 0 degrees to 25 degrees, or from 0 degrees to 20 degrees, or even from 0 degrees to 15 degrees. In some cases, the divergence angle $\theta_0$ of partially collimated light beam 120 can be 23 degrees.

Details of the size and shape of the partially collimated light beam 120 are determined by design details of the light source from which it is emitted. Any suitable light source may be used to inject light into the light duct, including in some cases the sun, but typically visible light emitting solid state light sources, such as light emitting diodes or "LEDs", are used. In most practical embodiments the light emitted by a particular LED or group of LEDs will have a peak wavelength in the visible spectrum, e.g. from about 400 to 700 nm. The term LED includes incoherent encased or encapsulated semiconductor devices marketed as "LEDs", whether of the conventional or super radiant variety, as well as coherent semiconductor devices such as laser diodes, including but not limited to vertical cavity surface emitting lasers (VCSELs). An "LED die" is an LED in its most basic form, i.e., in the form of an individual component or chip made by semiconductor processing procedures. The component or chip can include electrical contacts suitable for application of power to energize the device. The individual layers and other functional elements of the component or chip are typically formed on a wafer scale, and the finished wafer can then be diced into individual piece parts to yield a multiplicity of LED dies. Some packaged LEDs are made by forming a polymer encapsulant over an LED die and an associated reflector cup. Some packaged LEDs also include one or more phosphor materials that are excited by an ultraviolet or short wavelength visible LED die, and fluoresce at one or more wavelengths in the visible spectrum. An "LED" for purposes of this application should also be considered to include organic light emitting diodes, commonly referred to as OLEDs.

Multiple LEDs or other solid state light sources or other light sources may be combined to provide a light source assembly to provide the desired partially collimated light beam 120. The light source assembly may also include other components such as one or more mounting base(s), reflector (s), lens(es), diffuser(s), filter(s), or the like. If the assembly includes multiple distinct light sources, some or all of them may provide substantially the same emission spectrum—i.e., any differences in their emission spectra may be minor, such as is typical for unit-to-unit variability; for example, sources that all emit nominally green visible light would be considered to be emitting substantially the same emission spectrum. Alternatively or in addition, some or all of the multiple light sources may provide substantially different emission spectra—i.e., the differences in their emission spectra may be greater than typical unit-to-unit variability; for example, a group of three sources, one emitting nominally red light, another emitting nominally green light, and another emitting nominally blue light, would be considered to be emitting substantially different emission spectra. If desired, light from the different colored sources can be mixed or blended to provide nominally white light, or some other desired color.

The light source assembly, alternatively referred to as a light engine, may also include an array of light horns. Each light horn may have a narrow end, an open wide end, and side walls extending from the narrow end to the wide end with the side walls shaped as truncated pyramids. One or more LEDs may be located at the narrow end of each of the light horns, with each of the light horns providing substantially collimated light from the LEDs at the wide end. The array of light horns may be made by providing a holder having a plurality of alignment apertures with angled side walls, placing a plurality of first shapes of the light horns into the alignment apertures with angled side walls, and placing a plurality of second shapes of the light horns into the alignment apertures substantially perpendicular and mated with the plurality of first shapes. The alignment apertures are used to form the light horns as truncated pyramids and maintain alignment of the horns in the array. Further description of such light source assemblies or light engines, and related systems and components, can be found in U.S. patent application 61/976,075, "Light Horn Arrays for Ducted Lighting Systems", filed Apr. 7, 2014, and such light engines may be used in the disclosed light ducts to provide partially collimated light beam 120.

Alternatively, the light source assembly or light engine may be or include a single parabolic, hemispherical, or other concave reflector in combination with one or more LEDs placed at or near a focal point of such reflector, or a single lens in combination with one or more LEDs placed at or near a focal point of such lens.

Regardless of the details of the light source assembly, the light beam 120 is injected into the cavity 116 at one end of the duct 110, and propagates generally along the direction of the longitudinal axis 115 of the light duct. Propagation is effected by reflection of light rays from the reflective inner surface 112 of the duct 110. Any suitable reflector can be used for the highly reflective inner surface 112, such as in some cases metals or metal alloys, metal or metal alloy coated films, organic or inorganic dielectric film stacks, or combinations thereof. The higher the reflectivity of the surface 112, i.e., the closer the reflectivity is to 100% specular reflectivity, the farther a light ray at a given angle of inclination can travel within the duct. For a reflectivity of 90%, a light ray can undergo 6 reflections ("bounces") before falling to half of its original intensity. Using the same criterion, the light ray can undergo 13 reflections for a reflectivity of 95%, and 34 reflections for a reflectivity of 98%. Particularly useful reflectors include polymeric multilayer interference reflectors such as 3M optical films, including mirror films and in particular 3M™ Enhanced Specular Reflector (ESR) film, formerly sold as Vikuiti™ Enhanced Specular Reflector (ESR) film. The 3M™ ESR film has greater than 98% specular reflectivity across the visible light spectrum, with no more than 2 percent of the reflected light directed more than 0.5 degrees from the specular direction.

Until the light intensity is degraded by an excessive number of reflections or bounces at the inner surface 112 of the duct 110, light from the light source may continue to propagate along the duct 110 unless it encounters a controlled output panel such as panel 130. As described further below, the output panel includes a plurality of reflective strips, which may be made of the same reflective material as that of the reflective inner surface 112, such as the 3M™ ESR film. Alternatively, the reflective strips of the controlled output panel 130 may be or comprise reflective material other than that used for the reflective inner surface 112. In any case, the reflective strips present an inner surface of high specular reflectivity to light rays traveling within the light duct. Such a light ray that encounters the controlled output panel may strike one of the reflective strips, or it may pass through a gap or space between neighboring reflective strips. If the light ray strikes a reflective strip, it is reflected and remains within the light duct at least until the next encounter with another interior surface of the duct. If the light ray instead avoids the reflective strips of the output panel and passes through a gap or space between such strips, the light ray may exit the light duct after passing additionally through at least one structured surface which is (or are) included in the controlled output panel. Such a structured surface typically has a multitude of angled facets, e.g. in the form of parallel linear prisms or parallel linear lenticular structures, or other suitable surface structures, which redirect incident light by refraction and/or reflection so as to shape the output beam as desired, e.g., as indicated by the angles φ and β in FIG. 1. In some cases, the structured surface may be or comprise a turning film and/or a steering film, as described further below. The probability that a light ray traveling within the light duct, and encountering the controlled output panel, passes through a gap or space between the reflective strips is proportional to the local percent open area associated with the reflective strips, which in turn depends on the width, number, and packing density or spacing of reflective strips. Thus, the rate at which light is extracted from the light duct can be controlled by adjusting this percent open area.

Figure 2A:
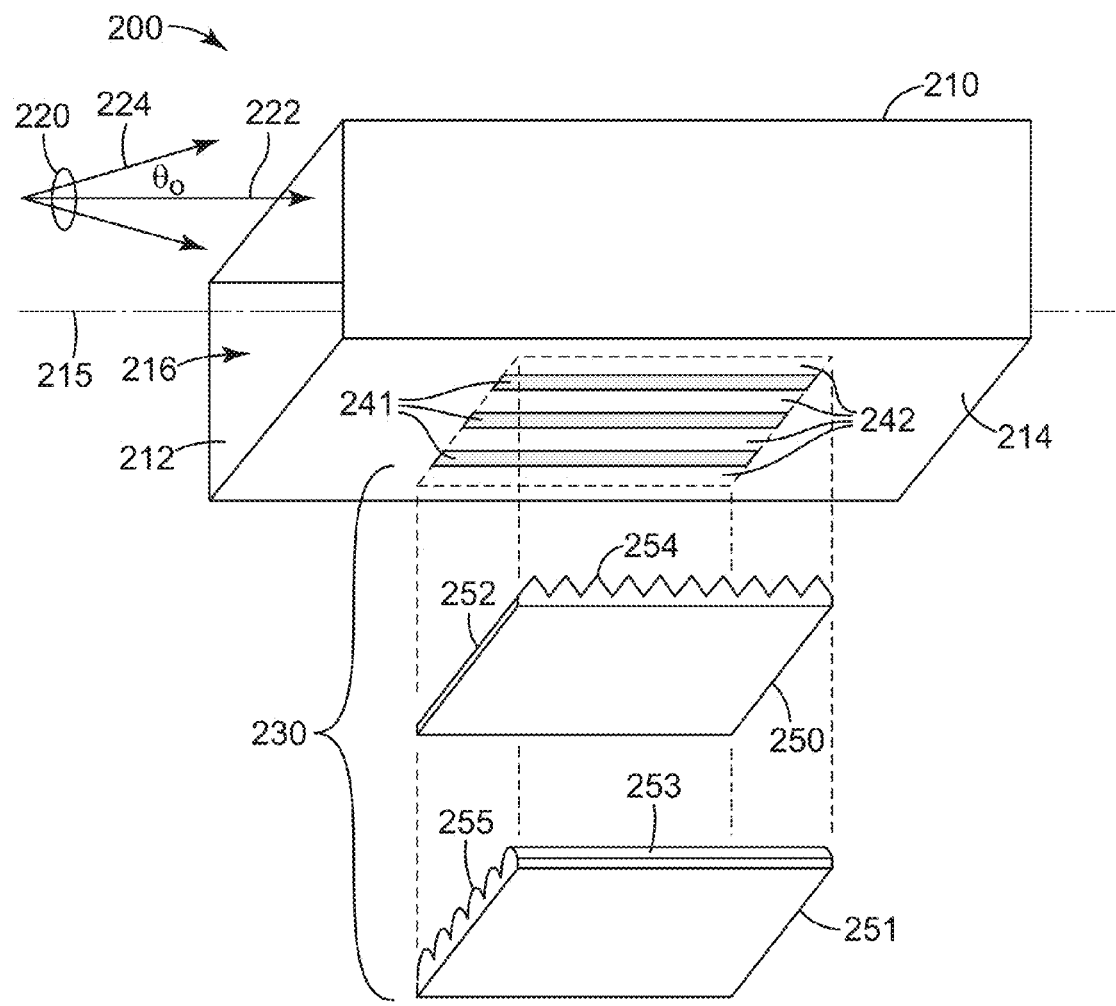
FIG. 2A is schematic perspective view of a lighting system similar to that of FIG. 1, the system including a light duct that includes a film stack (shown in exploded view) forming a controlled output panel of the duct.

Another lighting system 200, which may be the same as or similar to the lighting system of FIG. 1, is shown schematically in FIG. 2A. The lighting system 200 includes a rectangular light duct 210 with a reflective inner surface 212 surrounding a cavity 216 and defining a longitudinal axis 215, which elements may be the same as or similar to respective corresponding elements 110, 112, 116, and 115 in FIG. 1. The lighting system 200 also includes a light source, light source assembly, or light engine that injects a partially collimated light beam 220 into an end of the light duct 210, which beam 220 may be the same as or similar to the light beam 120. The partially collimated light beam 220 may be substantially in the form of a cone of light characterized by an input light divergence angle $\theta_0$ (i.e., a collimation half-angle $\theta_0$) and a central light ray 222. The lighting system 200 and light duct 210 include a film stack functioning as a controlled output panel 230, which may be the same as or similar to controlled output panel 130. The output panel 230 is shown in schematic exploded view in FIG. 2A so its individual components can be more easily seen. These individual components include reflective strips 241 separated from each other laterally to form spaces or gaps 242 therebetween. The individual components of the output panel 230 may also include one or more structured optical films, such as a prismatic turning film 250 and a steering film 251.

Light rays in the light duct 210 that pass through a gap 242 between reflective strips 241 may next encounter the turning film 250. The turning film 250 has a structured surface containing a plurality of parallel linear or elongated microstructures 252, each microstructure 252 having a prismatic cross-sectional shape. The microstructures 252 are disposed adjacent to the reflective strips 241 such that a vertex 254 of each microstructure 252 is positioned proximate an exterior surface 214 of light duct 210. The turning film 250 can intercept light rays exiting the cavity 216 through one of the plurality of gaps 242, and redirect them at other output directions. Preferably, the turning film 250 is oriented such that the vertices 254 each extend substantially perpendicular to the longitudinal axis 215 of the light duct. With this orientation, the light rays strike the prisms of the turning film in a direction substantially parallel to the plane of the turning film and perpendicular to the axes of the prisms; the divergence of their incidence from this norm is dictated by the degree of collimation within the light duct. Most of these rays may enter the turning film 250 by refracting through the first prism face encountered, then undergoing total internal reflection (TIR) at the opposing prism face, and finally refracting through the bottom of the film 250. There is no net change in the direction of propagation perpendicular to the axis of the light duct. The net change in direction along the axis of the light duct can be readily calculated by using the index of refraction of the turning film prism material and the included angle of the prisms. If desired, these may be selected to yield an angular distribution of transmitted light centered about the downward normal to the film 250. Since the turning film 250 transmits most of the light rays incident on it, very little light is returned to the light duct, which helps to maintain the substantial collimation of light propagating within the light duct.

The turning film 250 may be or comprise a film as shown in FIG. 2A, with one structured major surface and one flat, smooth major surface, the structured major surface having an array of parallel linear or otherwise elongated prismatic microstructures, the prisms being characterized by prism angle(s), prism height(s), and prism pitch(es). One, some, or all of the prism angle, prism height, and prism pitch may be uniform throughout the structured surface, or one, some, or all may be non-uniform throughout the structured surface. In some cases, the turning film 250 may be or comprise 3M™ or Vikuiti™ Image Directing Film, available from 3M Company.

Light rays that pass through the turning film 250 may next encounter a decollimation film or plate, also referred to as a steering film 251. This film 251 has a structured surface containing a plurality of parallel linear or elongated microstructures 253, each microstructure 253 having a curved or lenticular cross-sectional shape, and a steering vertex 255. As shown, the steering film 251 may be disposed adjacent the turning film 250 and opposite the reflective strips 241 of the film stack which forms the output panel 230. Light rays exiting the turning film 250 may strike the structured surface of the steering film 251 substantially normal to the plane of the film 251. Most of these rays may enter the steering film 251 by refracting at the curved microstructures 253 into directions determined by the local slope of the structured surface, and then exiting the steering film 251 by passing through its bottom surface. For these light rays, there is no net change in the direction of propagation along the axis 215 of the light duct. The net change in direction perpendicular to the axis is determined by the index of refraction and the distribution of surface slopes of the structured surface of the film 251. The structured surface of the steering film 251 can be a smooth curved surface such as a cylindrical or aspheric ridge-like lens, or can be piecewise planar, such as to approximate a smooth curved lens structure. The shape of the lenticular microstructures 253 may be selected to yield a specified distribution of illuminance upon target surfaces occurring at distances from the light duct large compared to the cross-duct dimension of the emissive surface. Again, since most rays are transmitted, very little light is returned to the light duct, preserving the collimation within the light duct.

Preferably, the steering film 251 is oriented such that the vertices 255 each extend substantially parallel to the longitudinal axis 215 of the light duct 210. With this orientation, each of the microstructures 253 can refract light rays into directions that are perpendicular to the longitudinal axis 215. In this way, a light ray that exits the cavity 216 through the controlled output panel 230 is redirected into a first direction disposed within a first plane perpendicular to the light duct cross-section (i.e., within a plane parallel to the longitudinal axis 215) by the turning film 250, and into a second direction within a second plane parallel to the light duct cross section (i.e., within a plane perpendicular to the longitudinal axis 215) by the steering film 251.

Figure 2B:
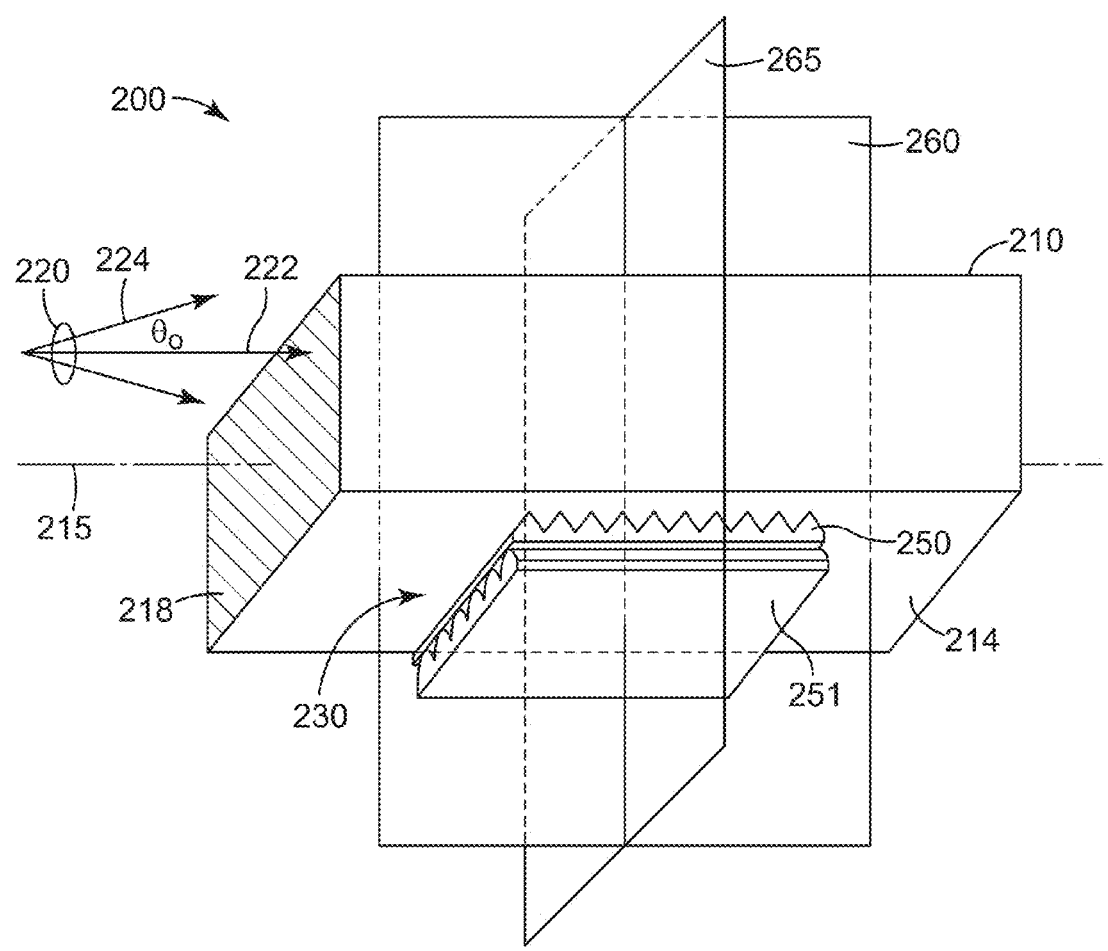
FIG. 2B is a schematic perspective view of the lighting system of FIG. 2A, but where the film stack is not shown in exploded view.

The lighting system 200 is shown again in FIG. 2B, but in this figure the film stack 230 is shown (schematically) in its ordinary sandwiched configuration rather than in exploded view, and some cross-sectional reference planes are superimposed on the light duct. Like elements relative to FIG. 2A have like reference numbers, and their descriptions will not be repeated. In FIG. 2B, a cross-section 218 of the light duct 210 is perpendicular to the longitudinal axis 215. The cross-section 218 is also perpendicular to a first reference plane 260, which contains the longitudinal axis 215 and is perpendicular to the turning film 250. In contrast, the cross-section 218 is parallel to a second reference plane 265, and each of these elements are perpendicular to both the first reference plane 260 and to the turning film 250.

The cross-section 218 of the light duct 210 is shown as being rectangular for simplicity of illustration, but the light duct 210, and the other light ducts disclosed herein, may have alternative cross-sectional shapes. The alternative shape may be or comprise any suitable polygonal shape such as a triangle, rectangle, square, pentagon, hexagon, and so forth. The alternative shape may also be or comprise a shape that is wholly or partially rounded or curved, such as a circle, oval, semicircle, or the like. Any alternative shape for the cross-section 218 may have one or more symmetries, e.g. mirror symmetry, point symmetry, or rotational symmetry, or it may not have any apparent symmetries. Regardless of the cross-sectional shape chosen, the light duct is still provided with a reflective inner surface except at the controlled output panel(s), where reflective strips reflect some light and allow other light to be transmitted through gaps between the strips. Furthermore, the disclosed lighting systems may have a modular construction. For example, the lighting systems may include a plurality of light ducts connected in sequence and an attachment device configured to attach two adjacent light ducts. At least one of the light ducts may include: a longitudinal axis; a plurality of coated panels; a plurality of rails disposed parallel to the longitudinal axis, each of the rails configured to receive the coated panels; and an end frame disposed generally perpendicular to the longitudinal axis and proximate one of the two ends of a coated panel. Further description of modular lighting systems, and other modular distribution systems and related systems, components, and methods, can be found in U.S. patent application 61/918,371, "Modular Distribution System", filed Dec. 19, 2013.

Still in reference to FIG. 2B, the lighting element 200 includes a steering film 251 disposed adjacent to the turning film 250, such that the turning film 250 is positioned between the steering film 251 and the exterior 214 of the light duct 210. The steering film 251 is disposed to intercept light exiting from the turning film 250 and provide angular spread of the light in a radial direction (i.e., in directions within the second reference plane 265).

Figure 2C:
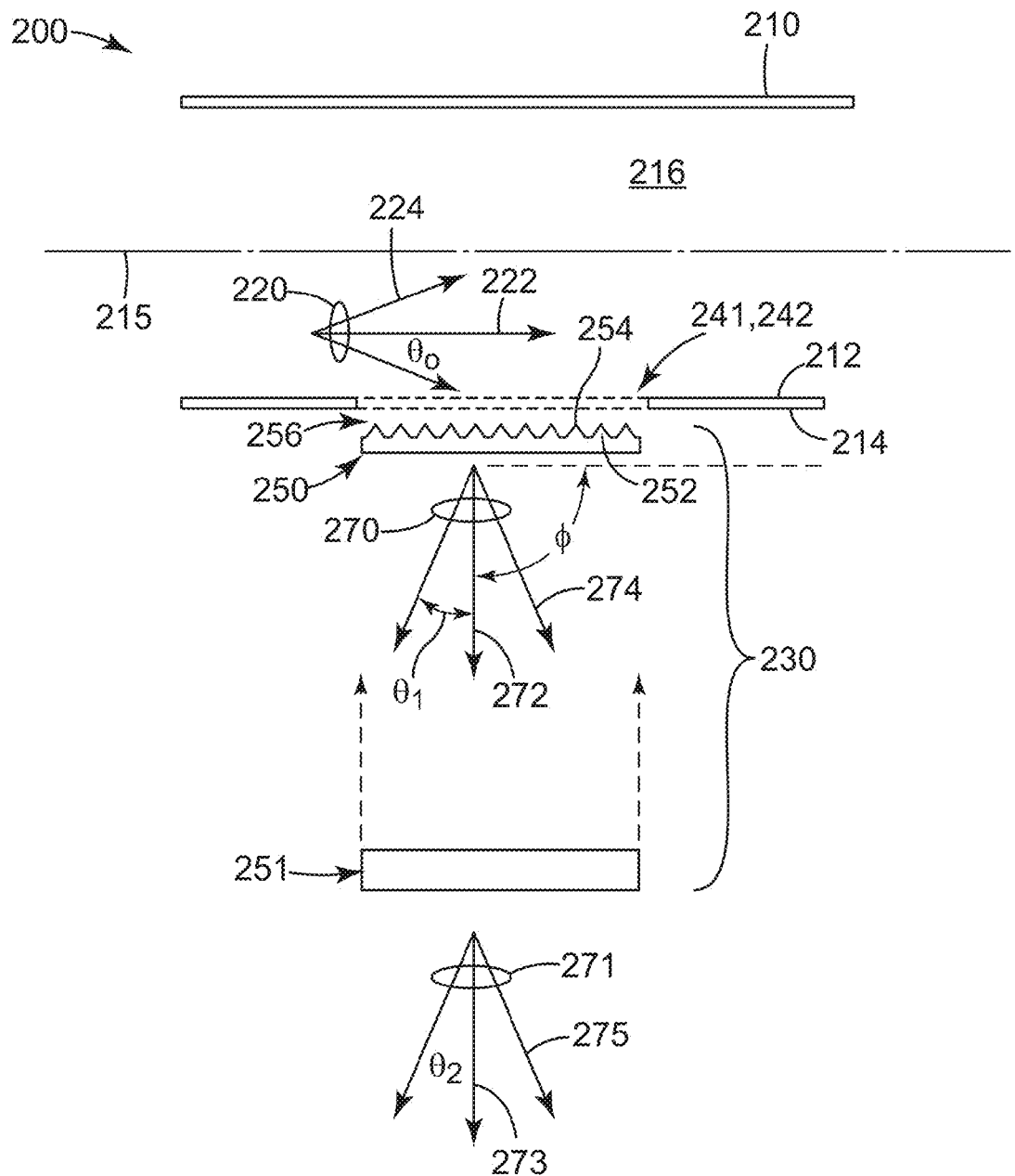
FIGS. 2C and 2D are schematic cross-sectional views of the lighting system of FIG. 2B.
Figure 2D:
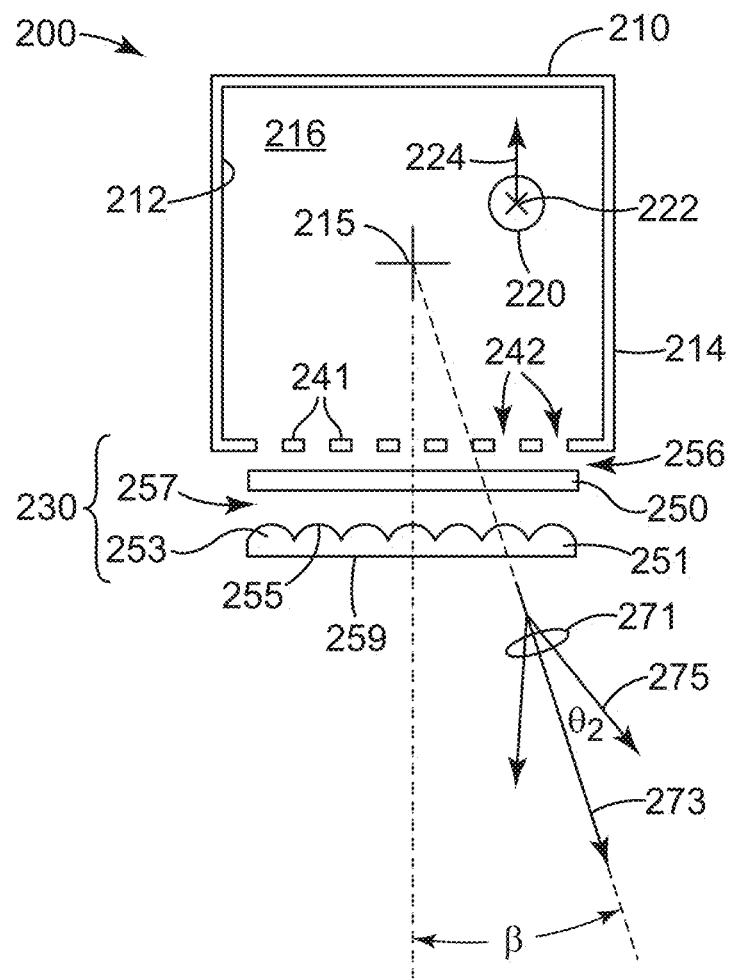

Cross-sectional views of the lighting system 200 taken along the first and second reference planes 260, 265 are shown schematically in FIGS. 2C and 2D, respectively.

In FIG. 2C, the partially collimated light beam 220, with its central light ray 222 and boundary light rays 224 disposed within an input collimation half-angle $\theta_0$, propagates efficiently along and within the light duct 210 with its reflective inner surfaces 212. At the controlled output panel 230, the reflective inner surface 212 is replaced with a film stack that includes the reflective strips 241 (and gaps 242 between the strips, see FIG. 2A), the turning film 250, and the steering film 251. The film stack also preferably includes discontinuous adhesive layers to attach the strips and other optical films to each other, as described further below. The steering film 251 is shown separated from the turning film 250 in FIG. 2C for reasons that will become apparent. At the output panel 230, some of the propagating light strikes the reflective strips 241 and is reflected back into the cavity 216, and the substantial remainder of the propagating light passes through the gaps 242 between the strips 241, and is shaped or otherwise redirected by the structured optical films as it exits the light duct. The structured optical films may include the turning film 250 and the steering film 251.

The turning film 250 has a plurality of parallel linear or elongated prismatic microstructures 252, as described above, each microstructure 252 having a vertex 254. The film 250 may be positioned such that the vertices 254 of the microstructures 252 are proximate the exterior surface 214 of light duct 210. In some cases, each vertex 254 can be immediately adjacent to the exterior surface 214. In other cases, each vertex 254 can instead be separated from the exterior surface 214 by a separation distance 256. The turning film 250 is positioned to intercept and redirect light rays exiting the cavity 216 through one of the plurality of gaps 242.

Each vertex 254 has an included angle between planar faces of its associated prismatic microstructure 252. This included angle may be in a range from, for example, 30 degrees to 120 degrees, or 45 degrees to 90 degrees, or 55 degrees to 75 degrees, to redirect light incident on the microstructures as desired. In some cases, the included angle ranges from 55 degrees to 75 degrees, and the partially collimated light beam 220 that exits through the gaps 242 is redirected by the turning film 250 away from the longitudinal axis 215. The redirected portion of the partially collimated light beam 220 may exit as a partially collimated output light beam 270 having a central light ray 272 and boundary light rays 274 disposed within an output collimation half-angle $\theta_1$ and directed at a longitudinal angle $\varphi$ from the longitudinal axis 215. In some cases, the input collimation half-angle $\theta_0$ and the output collimation half angle $\theta_1$ can be the same, and the collimation of light is retained. The longitudinal angle $\varphi$ from the longitudinal axis can be in a range from 45 degrees to 135 degrees, or from 60 degrees to 120 degrees, or from 75 degrees to 105 degrees, or can be approximately 90 degrees, depending on the included angle of the microstructures.

The light that exits the turning film 250 then encounters the steering film 251. The steering film 251 is positioned adjacent the turning film 250 and opposite the reflective strips 241 of the output panel 230 of the light duct 210 to intercept and refract the partially collimated output light beam 270. The partially collimated output light beam 270 may exit the steering film 251 as a partially collimated steered light beam 271 having a central steered light ray 273 and boundary steered light rays 275 disposed within a steered collimation half-angle $\theta_2$.

The steering film 251 can be seen more clearly from the perspective of FIG. 2D. From this perspective, the longitudinal axis 215 of the light duct 210 is perpendicular to the plane of the drawing. We saw in FIG. 2C that the turning film 250 is positioned to intercept and redirect light rays exiting the cavity 216 through one of the plurality of gaps 242, such that the redirection of light rays occurs in the first reference plane 260, which contains the longitudinal axis 215. In some cases, the turning film 250 may be configured and oriented so as to not substantially influence the path of light rays within the second reference plane 265.

The path of light rays within the second reference plane 265, i.e. in radial directions about the longitudinal axis 215, is influenced by the steering film 251. The steering film 251 has a structured major surface and a smooth or planar major surface 259. The structured major surface contains a plurality of parallel linear or elongated microstructures 253, each microstructure 253 having a curved or lenticular cross-sectional shape, and a steering vertex 255. The steering film 251 may be positioned close to the turning film 250 such that each steering vertex 255 is immediately adjacent to the turning film 250. Alternatively, the steering film 251 may positioned such that each steering vertex 255 is separated from the turning film 250 by a separation distance 257.

Each microstructure 253 can be oriented parallel to the longitudinal axis 215 of the light duct 210, such that each microstructure 253 refracts light rays exiting the turning film 250 into a direction perpendicular to the longitudinal axis 215, such that a light ray that exits the cavity through the controlled output panel 230 is redirected into a first direction disposed within the first reference plane 260 by the turning film 250, and into a second direction within the second reference plane 265 by the steering film 251.

In some cases, the partially collimated output light beam 270 may exit the steering film 251 as a partially collimated steered light beam 271 having a central steered light ray 273 and boundary steered light rays 275 disposed within a steered collimation half-angle $\theta_2$. A first component of the central steered light ray 273 is directed within the second reference plane 265 in a second direction at a radial angle $\beta$ from the first reference plane 260. A second component of the central steered light ray 273 is directed within the first plane 260 in a first direction at a longitudinal output angle $\varphi$ from the longitudinal axis (see e.g. FIG. 1). In some cases, each of the input collimation half-angle $\theta_0$, the output collimation half angle $\theta_1$, and the steered collimation half-angle $\theta_2$ can be substantially the same, and the collimation of light may be substantially retained. The radial angle $\beta$ around the longitudinal axis may be in a range from 0 degrees to ±90 degrees, or from 0 degrees to ±45 degrees, or from 0 degrees to ±30 degrees, of the light duct 210.

As mentioned above, the various components of the film stack may be manufactured separately and then laminated together using adhesive materials or the like, so that the film stack can be mounted, manipulated, or otherwise handled as a single cohesive unit. Such details of construction are shown in the schematic exploded view of FIG. 3. In that figure, a film stack 330, which may serve as a controlled output panel for a light duct, is shown in the context of a local Cartesian x-y-z coordinate system. The film stack 330 includes reflective strips 341, a turning film 350, and a steering film 351. These components may be the same as or similar to corresponding components discussed above, i.e., the reflective strips 341 may be the same as or similar to reflective strips 241, the turning film 350 may be the same as or similar to turning film 250, and the steering film 351 may be the same as or similar to steering film 251. The reflective strips 341 are separated from each other laterally to form spaces or gaps 342 therebetween. The turning film 350 has opposed major surfaces 350a, 350b, where major surface 350a is a structured surface having a multitude of parallel linear or elongated prismatic microstructures 352, which may be the same as or similar to microstructures 252 discussed above, and the opposed major surface 350b is flat and smooth. The prismatic microstructures 352 are elongated along the y-axis. The steering film 351 has opposed major surfaces 351a, 351b, where major surface 351a is a structured surface having a multitude of parallel linear or elongated lenticular microstructures 353, which may be the same as or similar to microstructures 253 discussed above, and the opposed major surface 351b is flat and smooth. The lenticular microstructures 353 are elongated along the x-axis, perpendicular to the y-axis.

In addition to these components, the film stack 330 also includes a transparent or otherwise light-transmissive plate 392, whose material properties and thickness may be selected to provide structural rigidity to the stack 330. For example, if the film stack 330 is installed in a lighting system in which the stack 330 is supported only along two opposed edges, the plate 392 may be sufficiently rigid so that the stack 330 does not appreciably sag, bend, or bow in its central region.

Figure 3:
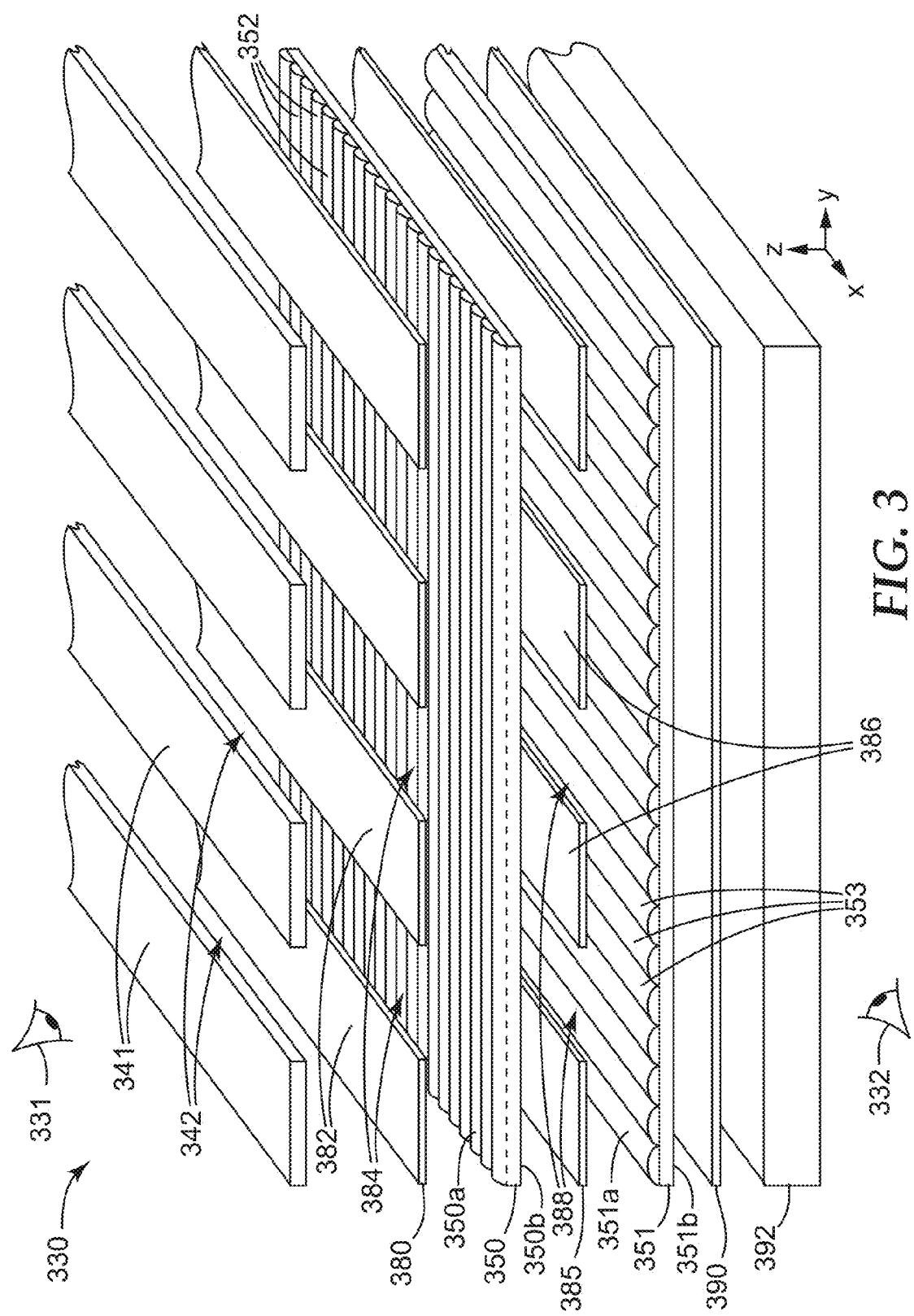
FIG. 3 is a schematic perspective exploded view of a film stack that includes a plurality of reflective strips and two structured optical films.

In order to bond the various components together to form a single cohesive unit, the film stack 330 includes: adhesive layer 380, which bonds the reflective strips 341 to the turning film 350; adhesive layer 385, which bonds the turning film 350 to the steering film 351; and adhesive layer 390, which bonds the steering film 351 to the plate 392. The adhesive layers 380 and 385 are both discontinuous in nature, i.e., the adhesive in these layers is present in some locations and absent in other locations. This is because each of these layers contacts a structured surface—the adhesive layer 380 contacts the structured major surface 350a of turning film 350, and the adhesive layer 385 contacts the structured major surface 351a of the steering film 351. In places where adhesive material actually makes contact with the structured surface, the air-polymer interface at the structured surface is replaced with an adhesive-polymer interface, which substantially destroys or degrades the ability of the structured features (e.g. prismatic microstructures 352 or lenticular microstructures 353) to refract or reflect light as intended. To preserve the functionality of portions of the structured optical films, open areas are provided in the discontinuous adhesive layers to preserve the air-polymer interface, and the functionality of the structured features, in those locations. Thus, the adhesive layer 380 includes a first adhesive material in adhesive areas 382 and an absence of adhesive in open areas 384. The adhesive layer 385 includes a second adhesive material in adhesive areas 386 and an absence of adhesive in open areas 388. The adhesive layer 390 contains a third adhesive material. In the embodiment of FIG. 3, the adhesive layer 390 does not contact any structured surfaces; thus, there is no need for the layer 390 to be discontinuous, and it is shown as being continuous. The first, second, and third adhesive materials may be or comprise any suitable adhesive, e.g., a pressure sensitive adhesive or a hot melt adhesive. Pressure sensitive adhesives are normally tacky at room temperature and can be adhered to a surface by application of, at most, light finger pressure. An exemplary pressure sensitive adhesive is 3M™ Optically Clear Adhesive, available from 3M Company. Any or all of these adhesives may also include one or more additives or fillers. The first, second, and third adhesive materials may all be or comprise the same adhesive material, or only two may be or comprise the same adhesive material, or they may all be different from one another. The first, second, and third adhesive materials may all be substantially transparent or at least light-transmissive. However, in many cases the first and second adhesive materials (i.e., those used in the discontinuous adhesive layers) may instead have substantial light absorption or scattering, and they may even be opaque, since they may be substantially occluded or shielded by the reflective strips 341.

The adhesive areas 382 of adhesive layer 380 are drawn as having in-plane dimensions and orientations that are the same as or similar to corresponding reflective strips 341 with which they are associated. In some cases, the adhesive areas 382 may be in substantial registration with their associated reflective strips 341. In other cases, the dimensions of the adhesive areas 382 may be smaller than the dimensions of corresponding reflective strips 341 such that the adhesive areas 382 may be occluded or shielded by the reflective strips 341 without the need for perfect registration. In other cases, some or all of the adhesive areas 382 may not be in substantial registration with the associated reflective strips, but at least a major portion of the adhesive areas may be circumscribed by the reflective strips 341. Like the adhesive areas 382, the adhesive areas 386 of adhesive layer 385 are drawn as having in-plane dimensions and orientations that are the same as or similar to corresponding reflective strips 341 with which they are associated. In some cases, the adhesive areas 386 may be in substantial registration with their associated reflective strips 341. In other cases, the dimensions of the adhesive areas 386 may be smaller than the dimensions of corresponding reflective strips 341 such that the adhesive areas 386 may be occluded or shielded by the reflective strips 341 without the need for perfect registration. In other cases, some or all of the adhesive areas 386 may not be in substantial registration with the associated reflective strips, but at least a major portion of the adhesive areas may be circumscribed by the reflective strips 341. Reflective strips may be said to circumscribe most (a major portion) of a given set of adhesive areas if, in plan view, the reflective strips overlap with more than half of the collective area taken up by the adhesive areas.

For ease of description, we may designate a given side of a given film stack as a "front" side, and the opposite side of the stack as the "back" side. For purposes of this description, unless otherwise indicated to the contrary, we designate the front side of the stack as the side that the reflective strips are physically closest to, and the opposite side is the back side. This designation is merely for ease of description and should not be construed in an unduly limiting fashion. For example, a given film stack may be incorporated into a first lighting system with the "front" side of the stack facing towards, and the "back" side facing away from, the light source and/or user, while the same film stack may be incorporated into a different second lighting system with the "back" side of the stack facing towards, and the "front" side facing away from, the light source and/or user, for example. Thus, in FIG. 3, an observer 331 views the film stack 330 from its front side, while an observer 332 views the film stack 330 from its back side.

When incorporating the film stack 330 into a light duct such as that of FIG. 1 or 2A as a controlled output panel, the stack 330 may be disposed such that the front side of the stack 330 faces towards the cavity 116, 216, and the stack 330 may be oriented such that the local x-axis is parallel to the longitudinal axis 115, 215 of the light duct.

Figure 4:
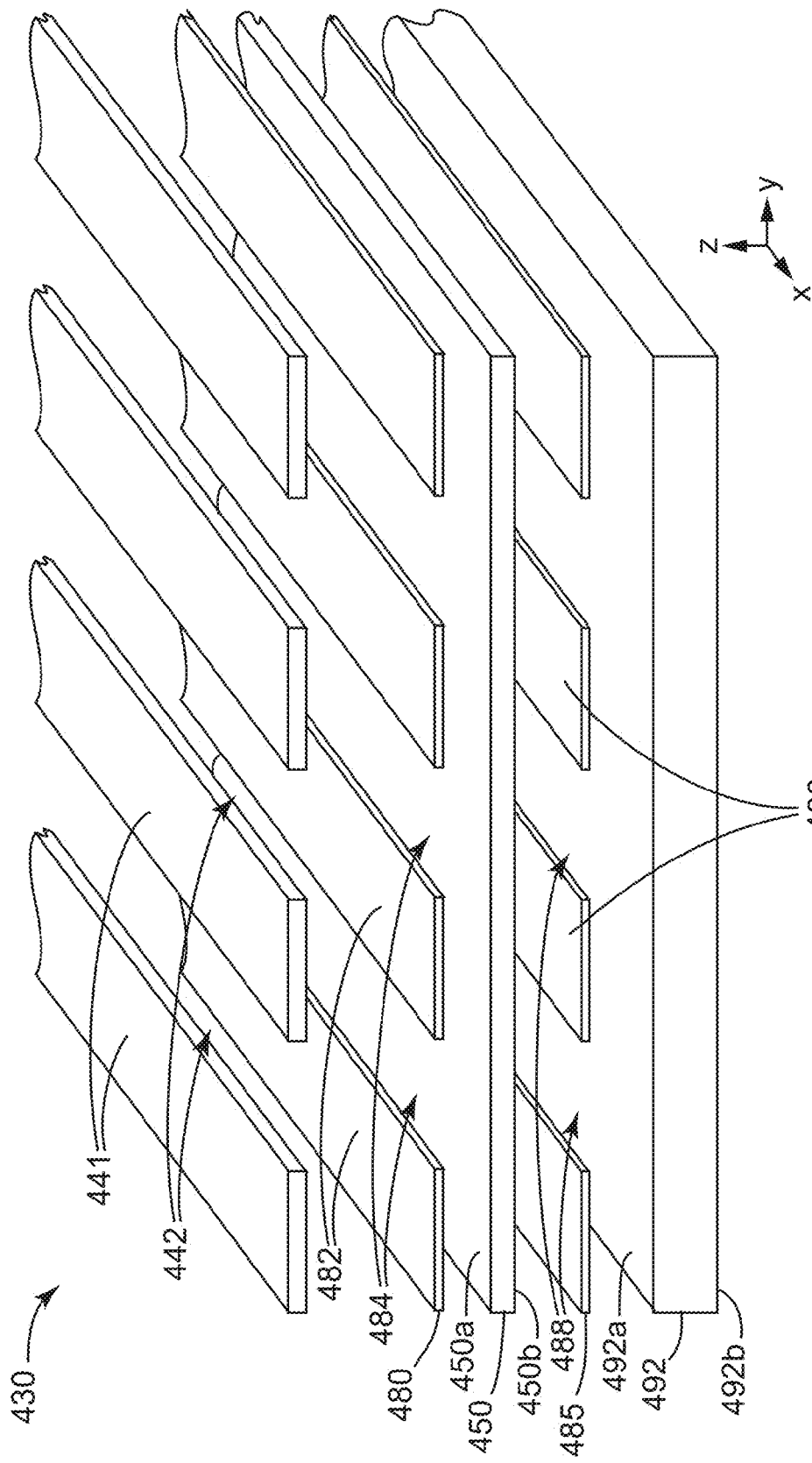
FIG. 4 is a schematic perspective exploded view of another film stack that includes a plurality of reflective strips and one or more structured surfaces.

A more generalized film stack 430 is shown schematically in FIG. 4. The film stack 430 includes reflective strips 441 which may be the same as or similar to reflective strips 341, and which are separated from each other laterally to form spaces or gaps 442 therebetween. The film stack 430 also includes a structured optical film 450 having opposed major surfaces 450a, 450b. Although not shown in the schematic figure, at least one of the surfaces 450a, 450b is a structured surface. For example, the structured optical film 450 may be the same as or similar to the turning film 350 of FIG. 3, in which case the surface 450a may be a structured surface having an array of linear or elongated prismatic microstructures, and the surface 450b may be substantially flat and smooth. In other cases, both major surfaces 450a, 450b of the structured optical film 450 may be structured surfaces, e.g. with prismatic, lenticular, or other types of structured features or microstructures. A discontinuous adhesive layer 480, which may be the same as or similar to discontinuous adhesive layer 380, has adhesive areas 482 and open areas 484. The adhesive in the adhesive areas 482 contacts the major surface 450a and bonds the reflective strips 441 to the structured optical film 450.

The stack 430 also includes a substrate 492. The substrate 492 may be only a single optical film, or it may be a plurality of optical components attached to each other, such as the elements 351, 390, and 392 in FIG. 3. The substrate 492 has opposed major surfaces 492a, 492b. One or both of these major surfaces may be structured surfaces, or neither may be structured surfaces. However, in exemplary embodiments, at least one of major surface 450b (of film 450) or major surface 492a (of substrate 492) is a structured surface. A discontinuous adhesive layer 485, which may be the same as or similar to discontinuous adhesive layer 385, has adhesive areas 486 and open areas 488. The adhesive in the adhesive areas 486 contacts the major surfaces 450b and 492a, at least one of which may be a structured surface to redirect light as desired, and bonds the structured optical film 450 to the substrate 492.

At least the structured optical film 450 and the substrate 492 comprise transparent or light-transmissive polymers or other light-transmissive optical materials, such that a light ray that passes through any of the gaps 442 can pass through the film 450 and substrate 492, even though the light ray may be deviated in direction according to the specifics of the structured surface(s) employed in the stack. Exemplary light-transmissive materials include, for example, polymers such as polycarbonates and copolycarbonates, polyesters and copolyesters (including PEN, coPEN, PET, and coPET), vinyl polymers and copolymers, styrenes, curable and cured resins, as well as non-polymer materials such as glasses and ceramics. The particular light-transmissive optical material (s) chosen may depend on factors such as availability, transparency, refractive index, manufacturability, cost, and so forth.

The film stack 430 is shown in the context of a local Cartesian x-y-z coordinate system. The reflective strips 441, the adhesive areas 482, and the adhesive areas 486 are all shown as being elongated along the x-direction, similar to the configuration of film stack 330. However, other orientations are also contemplated. When incorporating the film stack 430 into a light duct such as that of FIG. 1 or 2A as a controlled output panel, the stack 430 may be disposed such that the front side of the stack 430 faces towards the cavity 116, 216, and the stack 430 may be oriented such that the local x-axis is parallel to the longitudinal axis 115, 215 of the light duct.

We will now explore some of the wide variety of possible configurations of reflective strips and discontinuous adhesive layers in the disclosed film stacks.

Figure 5A:
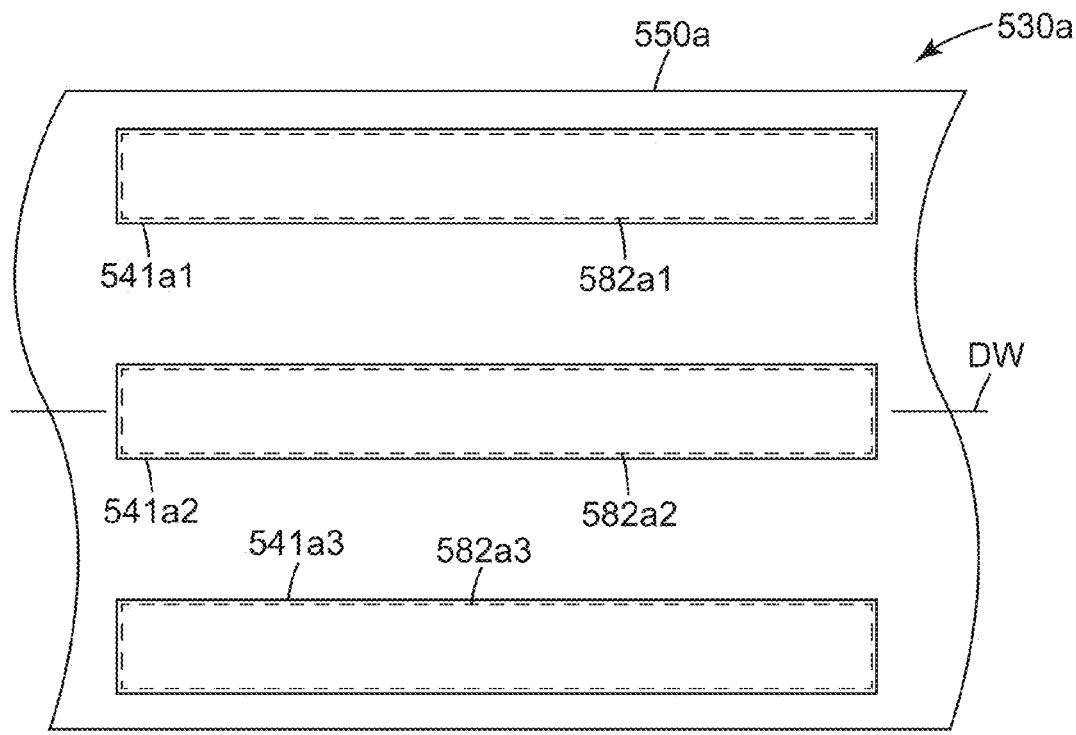
FIG. 5A is a schematic plan view of a film stack having a plurality of reflective strips and a discontinuous adhesive layer.

In FIG. 5A, we see a (schematic) plan view of a film stack 530a as viewed from the front side of the stack. The film stack 530a includes a structured optical film 550a to which is attached a plurality of reflective strips 541a1, 541a2, 541a3 (collectively, 541a). The structured optical film 550a may be the same as or similar to the structured optical film 450, or it may be another suitable structured optical film. At least one of the two opposed major surfaces of the optical film 550a is a structured surface. The reflective strips 541a are separated from each other laterally to form spaces or gaps between them through which light can pass. The reflective strips 541a attach to the optical film 550a by a discontinuous adhesive layer which is divided into adhesive areas 582a1, 582a2, 582a3 (collectively, 582a), and open areas between the adhesive areas. The discontinuous adhesive layer may be the same as or similar to the discontinuous adhesive layer 480.

The structured optical film 550a may be a film made on a film line, e.g., using a roll-to-roll manufacturing process, that defines a down-web direction DW corresponding to the length of the film, and a cross-web direction (orthogonal to the down-web direction) corresponding to the width of the film. The reflective strips 541a are arranged on the film 550a such that each strip extends in an elongation direction parallel to the down-web direction DW. The reflective strips 541a are straight, rectangular in shape, of equal length and width, and equally spaced from each other. In alternative embodiments, the reflective strips need not be straight (e.g. they may undulate along their length), they need not be rectangular in shape, they need not be of equal length or width, and they need not be equally spaced from each other.

Furthermore, although there are significant advantages for applying the reflective strips 541a in a manner so that the elongation direction of each strip is parallel to the DW direction of the structured optical film 550a, in alternative embodiments the elongation direction of the strips may intersect the DW direction at a non-zero angle, e.g., the angle of intersection may be a right angle or it may be oblique, i.e., greater than 0 but less than 90 degrees. When the reflective strips are oriented so that their elongation directions are parallel to the DW direction of the structured optical film, then one, some, or all of the discontinuous adhesive layers in the film stack can be conveniently applied to the structured optical film or other film of interest in a roll-to-roll process by simply printing a set of lengthwise adhesive stripes on the (continuously moving) film, and only controlling the width and lateral position of the stripes so they are adequately aligned with the reflective strips. After such a process, the manufactured film laminate, which may be in roll form, can be cut at lengthwise intervals, and optionally laminated to other optical film(s) or substrate(s), to provide large numbers of finished optical film stacks at relatively low cost.

The adhesive areas 582a in FIG. 5A are shown to be of substantially the same size, shape, and orientation, and in substantial registration, with their respective reflective strips 541a. In such a case, substantially 100% of the collective area taken up by the adhesive areas 582a is circumscribed by the reflective strips 541a. Stated differently, a major portion of the adhesive areas 582a is circumscribed by the reflective strips 541a. Although the adhesive areas 582a are meant to represent the discontinuous adhesive layer that bonds the reflective strips to the structured optical film 550a, they can alternatively represent the adhesive areas of other discontinuous adhesive layers in the film stack 530a, e.g., a discontinuous adhesive layer corresponding to discontinuous adhesive layers 485 or 385.

Figure 5B:
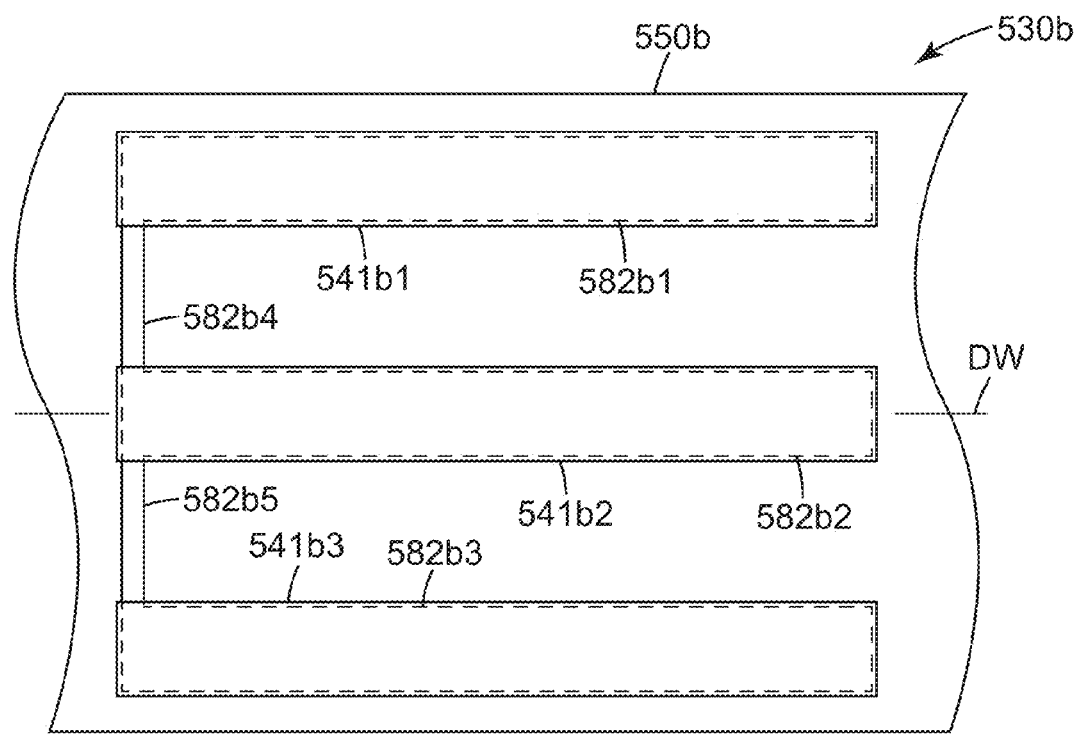
FIGS. 5B and 5C are schematic plan views of other film stacks that include a plurality of reflective strips and a discontinuous adhesive layer.

In FIG. 5B, we see a (schematic) plan view of another film stack 530b as viewed from the front side of the stack. The film stack 530b includes a structured optical film 550b to which is attached a plurality of reflective strips 541b1, 541b2, 541b3 (collectively, 541b). The structured optical film 550b may be the same as or similar to the structured optical film 550a; hence, certain aspects of this film will not be repeated. The reflective strips 541b are separated from each other laterally to form spaces or gaps between them through which light can pass. The reflective strips 541b attach to the optical film 550b by a discontinuous adhesive layer which is divided into adhesive areas 582b1, 582b2, 582b3, 582b4, and 582b5 (collectively, 582b), and open areas between the adhesive areas. This discontinuous adhesive layer differs from that of FIG. 5A in that the adhesive areas 582a of FIG. 5A are isolated from each other, whereas the adhesive areas 582b are interconnected due to the addition of the narrow adhesive areas 582b4 and 582b5.

The structured optical film 550b may be a film made on a film line, e.g., using a roll-to-roll manufacturing process, that defines a down-web direction DW corresponding to the length of the film, and a cross-web direction (orthogonal to the down-web direction) corresponding to the width of the film. The reflective strips 541b are arranged on the film 550b such that each strip extends in an elongation direction parallel to the down-web direction DW. The reflective strips 541b are straight, rectangular in shape, of equal length and width, and equally spaced from each other. In alternative embodiments, the reflective strips need not be straight (e.g. they may undulate along their length), they need not be rectangular in shape, they need not be of equal length or width, and they need not be equally spaced from each other. Furthermore, as discussed above in connection with FIG. 5A, although there are significant advantages for applying the reflective strips 541b in a manner so that the elongation direction of each strip is parallel to the DW direction of the structured optical film 550b, in alternative embodiments the elongation direction of the strips may intersect the DW direction at a non-zero angle, e.g., the angle of intersection may be a right angle or it may be oblique, i.e., greater than 0 but less than 90 degrees.

Most of the adhesive areas 582b in FIG. 5B are shown to be of substantially the same size, shape, and orientation, and in substantial registration, with their respective reflective strips 541b. However, the adhesive areas 582b also include areas 582b4 and 582b5, which fall outside of the plan view boundaries or borders of the reflective strips 541b. As can be seen by inspection of FIG. 5B, the relative dimensions and sizes of the adhesive areas 582b4, 582b5 relative to those of the adhesive areas 582b1, 582b2, 582b3 is such that the greater than 50% of the collective area taken up by the adhesive areas 582b is circumscribed by the reflective strips 541b. Stated differently, a major portion of the adhesive areas 582b is circumscribed by the reflective strips 541b. Although the adhesive areas 582b are meant to represent the discontinuous adhesive layer that bonds the reflective strips to the structured optical film 550b, they can alternatively represent the adhesive areas of other discontinuous adhesive layers in the film stack 530b, e.g., a discontinuous adhesive layer corresponding to discontinuous adhesive layers 485 or 385.

Figure 5C:
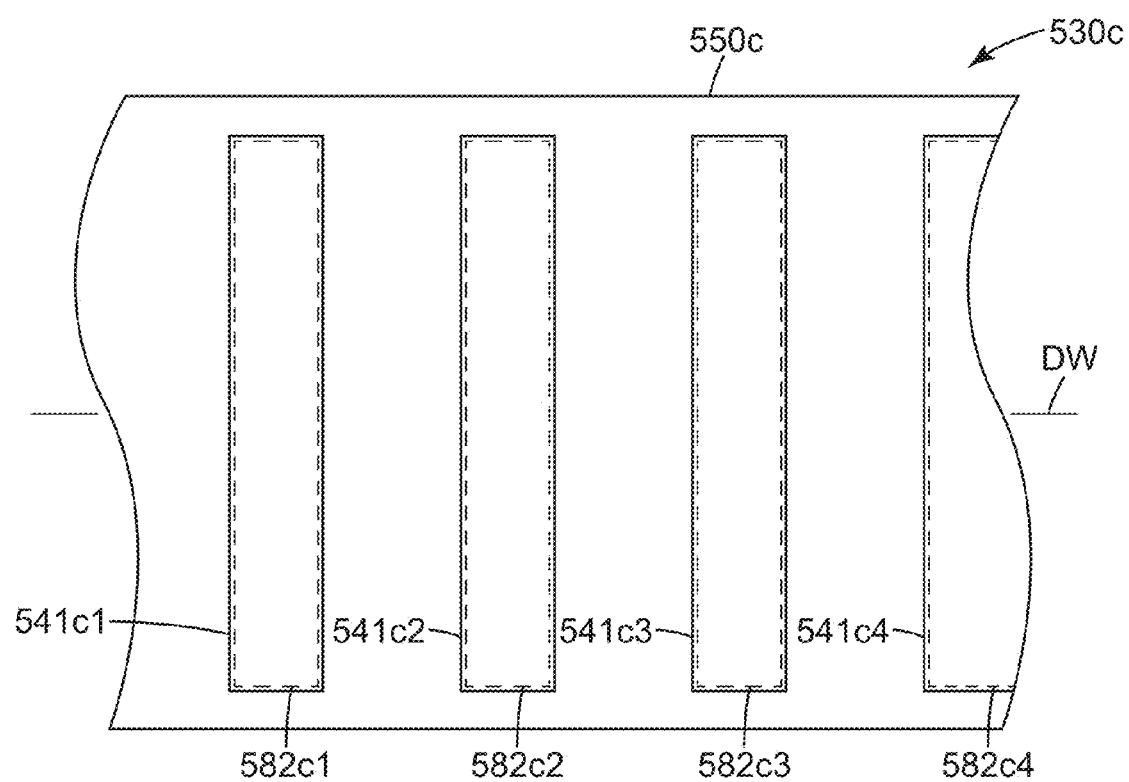

In FIG. 5C, we see a (schematic) plan view of another film stack 530c as viewed from the front side of the stack. The film stack 530c includes a structured optical film 550c to which is attached a plurality of reflective strips 541c1, 541c2, 541c3, 541c4 (collectively, 541c). The structured optical film 550c may be the same as or similar to the structured optical film 550b; hence, certain aspects of this film will not be repeated. The reflective strips 541c are separated from each other laterally to form spaces or gaps between them through which light can pass. The reflective strips 541c attach to the optical film 550c by a discontinuous adhesive layer which is divided into adhesive areas 582c1, 582c2, 582c3, and 582c4 (collectively, 582c), and open areas between the adhesive areas. This discontinuous adhesive layer differs from that of FIG. 5A in that the adhesive areas 582c are oriented orthogonally relative to the adhesive areas 582a of FIG. 5A.

The structured optical film 550c may be a film made on a film line, e.g., using a roll-to-roll manufacturing process, that defines a down-web direction DW corresponding to the length of the film, and a cross-web direction (orthogonal to the down-web direction) corresponding to the width of the film. As suggested above, the reflective strips 541c are arranged on the film 550c such that each strip extends in an elongation direction perpendicular to the down-web direction DW. The reflective strips 541c are straight, rectangular in shape, of equal length and width, and equally spaced from each other. In alternative embodiments, the reflective strips need not be straight (e.g. they may undulate along their length), they need not be rectangular in shape, they need not be of equal length or width, and they need not be equally spaced from each other. Furthermore, as discussed above in connection with FIG. 5A, in alternative embodiments the elongation direction of the strips may intersect the DW direction at an oblique angle, i.e., an angle greater than 0 but less than 90 degrees.

The adhesive areas 582c in FIG. 5C are shown to be of substantially the same size, shape, and orientation, and in substantial registration, with their respective reflective strips 541c. In such a case, substantially 100% of the collective area taken up by the adhesive areas 582c is circumscribed by the reflective strips 541c. Stated differently, a major portion of the adhesive areas 582c is circumscribed by the reflective strips 541c. Although the adhesive areas 582c are meant to represent the discontinuous adhesive layer that bonds the reflective strips to the structured optical film 550c, they can alternatively represent the adhesive areas of other discontinuous adhesive layers in the film stack 530c, e.g., a discontinuous adhesive layer corresponding to discontinuous adhesive layers 485 or 385.

Further possible configurations of reflective strips and discontinuous adhesive layers in the disclosed film stacks are illustrated in FIGS. 6A through 6F. In the context of a front plan view of a portion of a film stack as disclosed herein, each of these figures shows only a single reflective strip and adhesive area(s) (from a discontinuous adhesive layer) that is or are in the immediate vicinity of that reflective strip. The reader will understand that each of the illustrated relationships, as well as combinations thereof, can be readily extended to a complete film stack containing a plurality of reflective strips in a given orientation as discussed elsewhere.

In FIG. 6A, a reflective strip 641a is rectangular in shape. An adhesive area 682a of a discontinuous adhesive layer, disposed generally behind the strip, has substantially the same shape and orientation, and is substantially in registration with the reflective strip 641a. In a film stack containing more of the same or similar reflective strips, and in which other adhesive areas of the discontinuous adhesive layer are confined to areas near each strip in the same or similar manner, substantially 100% of the collective area taken up by the adhesive areas is circumscribed by the reflective strips, and a major portion of the adhesive areas is circumscribed by the reflective strips.

In FIG. 6B, a reflective strip 641b has the same rectangular shape as in FIG. 6A. An adhesive area 682b of a discontinuous adhesive layer, disposed generally behind the strip, also has a rectangular shape, but it is slightly narrower and slightly longer than that of the reflective strip 641b. In a film stack containing more of the same or similar reflective strips, and in which other adhesive areas of the discontinuous adhesive layer are confined to areas near each strip in the same or similar manner, a major portion of the adhesive areas is circumscribed by the reflective strips.

In FIG. 6C, a reflective strip 641c has the same rectangular shape as in FIG. 6A. An adhesive area 682c of a discontinuous adhesive layer, disposed generally behind the strip, also has a rectangular shape, but it is slightly wider and slightly shorter than that of the reflective strip 641c. In a film stack containing more of the same or similar reflective strips, and in which other adhesive areas of the discontinuous adhesive layer are confined to areas near each strip in the same or similar manner, a major portion of the adhesive areas is circumscribed by the reflective strips.

In FIG. 6D, a reflective strip 641d has the same rectangular shape as in FIG. 6A. An adhesive area 682d of a discontinuous adhesive layer, disposed generally behind the strip, has an irregular extended shape, and although some portions of the irregular shape extend beyond the boundary or limits of the reflective strip, most portions do not. In a film stack containing more of the same or similar reflective strips, and in which other adhesive areas of the discontinuous adhesive layer are confined to areas near each strip in the same or similar manner, a major portion of the adhesive areas is circumscribed by the reflective strips.

In FIG. 6E, a reflective strip 641e has the same rectangular shape as in FIG. 6A. An irregular group of adhesive areas 682e1 through 682e9 of a discontinuous adhesive layer, disposed generally behind the strip, provide isolated islands of adhesive material, and although some portions of these irregular areas extend beyond the boundary or limits of the reflective strip, most portions do not. In a film stack containing more of the same or similar reflective strips, and in which other adhesive areas of the discontinuous adhesive layer are confined to areas near each strip in the same or similar manner, a major portion of the adhesive areas is circumscribed by the reflective strips.

In FIG. 6F, a reflective strip 641f has the same rectangular shape as in FIG. 6A. A regular group of adhesive areas 682f1 through 682f6 of a discontinuous adhesive layer, disposed generally behind the strip, provide isolated islands of adhesive material, substantially no portion of which extends beyond the boundary or limits of the reflective strip. In a film stack containing more of the same or similar reflective strips, and in which other adhesive areas of the discontinuous adhesive layer are confined to areas near each strip in the same or similar manner, substantially 100% of the collective area taken up by the adhesive areas is circumscribed by the reflective strips, and a major portion of the adhesive areas is circumscribed by the reflective strips.

Figure 7:
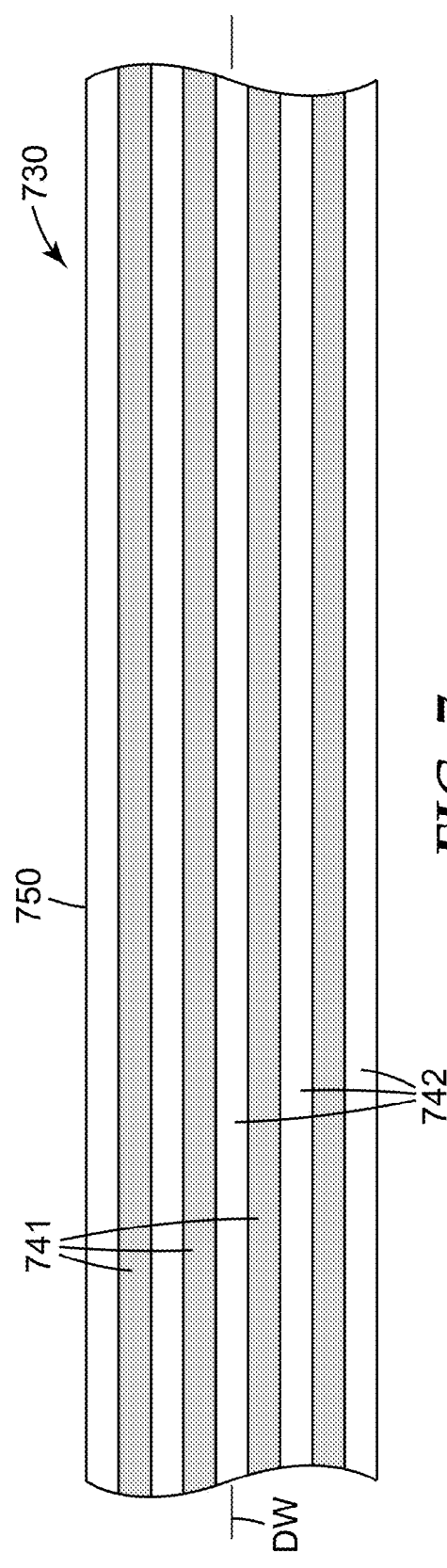
FIG. 7 is a schematic plan view of a film stack having a plurality of reflective strips of uniform width.
Figure 8:
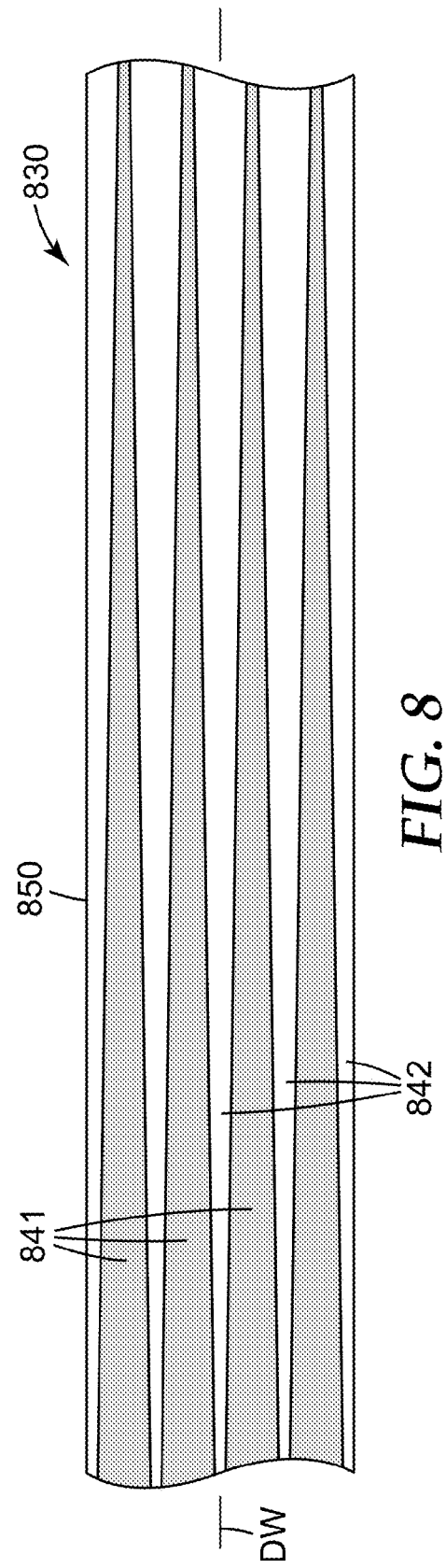
FIG. 8 is a schematic plan view of a film stack having a plurality of reflective strips of non-uniform width.
Figure 9:
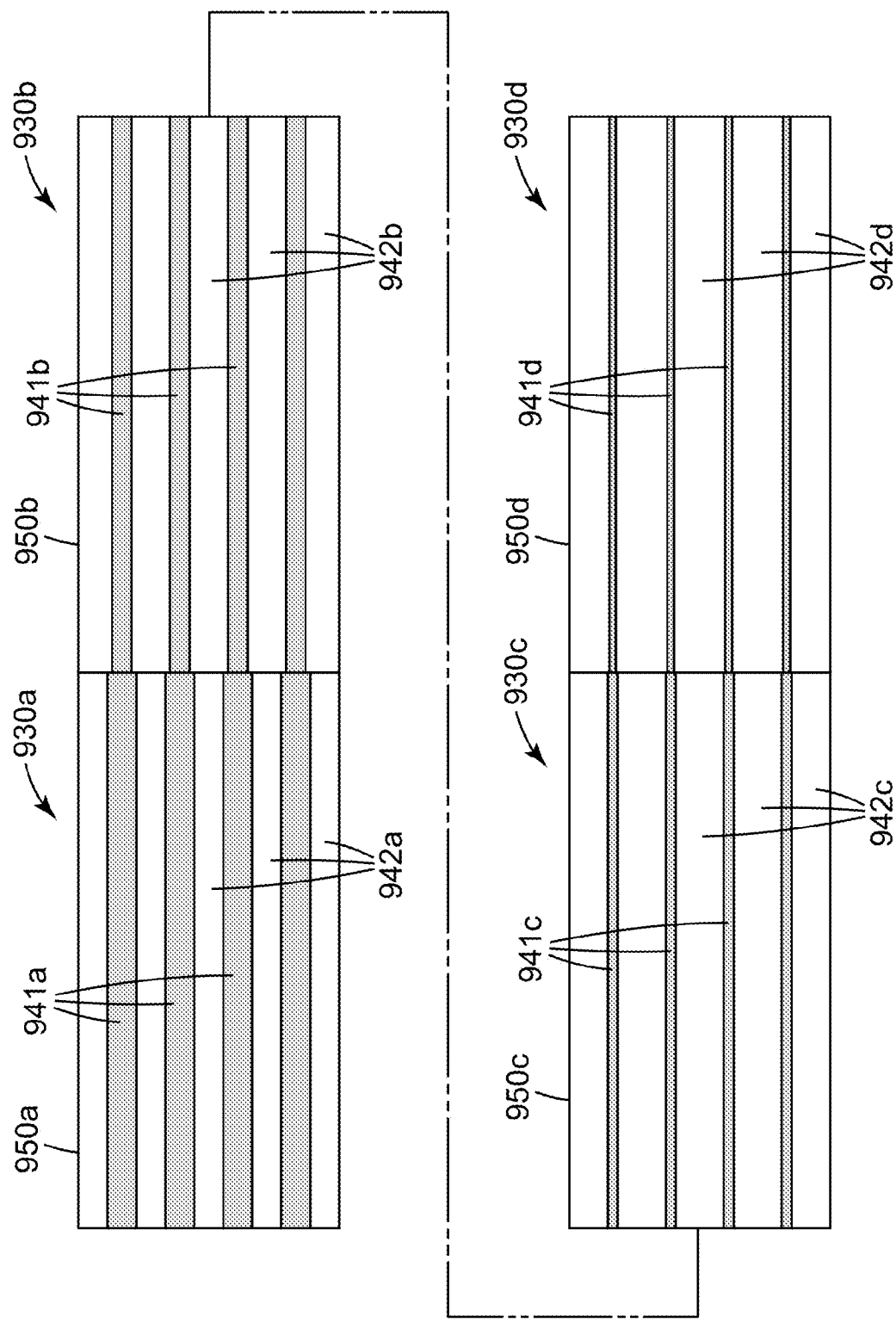
FIG. 9 is a schematic plan view of a series of film stacks with reflective strips having a step-wise progression of different widths.

Further possible configurations of reflective strips are illustrated in FIGS. 7 through 9. In the context of a front plan view of a portion of a film stack as disclosed herein, these figures illustrate some ways in which the reflective strips may change, or not change, along the length of the film stack. These figures are simplified and thus do not attempt to depict any discontinuous adhesive layers or other components of the film stack(s) other than the reflective strips and a structured optical film.

In FIG. 7, a film stack 730 includes a structured optical film 750 to which is attached reflective strips 741 by a discontinuous adhesive layer. At least one major surface of the structured optical film 750 is a structured surface with a multitude of microstructures to redirect light that passes through gaps 742 between the strips 741. The optical film 750 has a down-web direction DW along the length of the film, and a cross-web direction (orthogonal to the down-web direction) along the width of the film. The reflective strips 741, which may be the same as or similar to other reflective strips described herein, are arranged on the film 750 such that each strip extends in an elongation direction parallel to the down-web direction DW. The reflective strips 741 are straight, are equally spaced from each other, and have uniform widths along their respective lengths. The film stack 730 may be in roll form, such that numerous individual pieces or panels of it can be made by cutting in the cross-web direction at appropriate intervals corresponding to the desired lengths.

In FIG. 8, another film stack 830 includes a structured optical film 850 to which is attached reflective strips 841 by a discontinuous adhesive layer. The optical film 850 may be the same as or similar to the film 750, and to any other structured optical film disclosed herein. The optical film 850 has a down-web direction DW along the length of the film, and a cross-web direction (orthogonal to the down-web direction) along the width of the film. The reflective strips 841, which may be the same as or similar to other reflective strips described herein, are arranged on the film 850 such that each strip extends in an elongation direction parallel to the down-web direction DW. The strips 841 are separated from each other laterally to form spaces or gaps 842 therebetween. The reflective strips 841 are equally spaced from each other (as measured cross-web at any given down-web position), and have widths that taper from a maximum width to a minimum width (or vice versa) along their respective lengths. Due to the complementary nature of the reflective strips and the gaps between them, the gaps have a maximum width where the strips have a minimum width, and the gaps have a minimum width where the strips have a maximum width. The film stack 830 may be in roll form, such that numerous individual pieces or panels of it can be made by cutting in the cross-web direction at appropriate intervals corresponding to the desired lengths. The tapered pattern may repeat along the length of the film stack 830, or the film stack 830 may instead terminate at cross-web edges that correspond to the maximum and minimum widths of the strips 841. The tapered pattern can be useful in the context of light ducts, by positioning the film stack so that at the end of the film stack closest to the light source, where the light within the cavity is brightest, the strips have maximum widths (and the gaps between them have minimum widths), and at the end of the film stack farthest from the light source, where the light within the cavity is dimmest, the strips have minimum widths (and the gaps between them have maximum widths). Positioning the film stack with its tapered pattern in this fashion relative to the light source helps to provide a more even distribution of output illumination along the length of the light duct.

FIG. 9 shows a series of film stacks connected or otherwise coupled together to form one long, extended stack assembly. In this assembly, reflective strips 941a are attached to a structured optical film 950a by a first discontinuous adhesive layer in a first film stack 930a, reflective strips 941b are attached to a structured optical film 950b by a second discontinuous adhesive layer in a second film stack 930b, reflective strips 941c are attached to a structured optical film 950c by a third discontinuous adhesive layer in a third film stack 930c, and reflective strips 941d are attached to a structured optical film 950d by a fourth discontinuous adhesive layer in a fourth film stack 930d. The reflective strips 941a through 941d may be the same as or similar to other reflective strips disclosed herein, and the structured optical films may be the same or similar to other structured optical films disclosed herein. Gaps 942a are formed between strips 941a, gaps 942b are formed between strips 941b, gaps 942c are formed between strips 941c, and gaps 942d are formed between strips 941d, so that light can pass through any of the film stacks (as deviated by the structured surface(s) therein) between the reflective strips.

For any given one of the film stacks 930a through 930d, each reflective strip has a width that is uniform along its length, and the widths of some or all of the strips may be equal to each other, although in other embodiments they may be unequal. The reflective strips on a given film stack may also be uniformly spaced from each other, although they may instead be non-uniformly spaced in other embodiments. Each film stack has the same number of reflective strips, and the strips are arranged along respective centerlines that form a centerline pattern. The centerline pattern, which may for example be a set of equally spaced parallel lines, is substantially the same for all of the film stacks, such that when any two of the film stacks are joined or otherwise brought together at their ends, each reflective strip on one stack is in alignment with one corresponding reflective strip on the other stack. Configuring the film stacks in this way helps to provide a smooth continuous appearance to a lighting system when multiple film stacks are arranged end-to-end to form an extended output panel for a light duct. In FIG. 9, the widths of the strips on the different film stacks are different, and the stacks are arranged end-to-end as shown in a stepwise monotonic progression from wider strip widths to narrower strip widths, or vice versa. This stepwise progression of strip widths can be useful in more evenly distributing output illumination along the length of a light duct in a manner analogous to the tapered reflective strip pattern discussed above. Thus, by using the series of film stacks with their stepwise progression of strip widths as an extended output panel for a light duct, with the stack 930a having the widest strips (and narrowest gaps between strips) closest to the light source and the stack 930d having the narrowest strips (and widest gaps between strips) farthest from the light source, a more even distribution of output light can be realized along the length of the duct.

In an alternative embodiment to that of FIG. 9, the structured optical films 950a through 950d may be replaced with a single, long piece or sheet of a structured optical film, and the reflective strips 941a, 941b, 941c, 941d may then be arranged on that structured optical film in the same arrangement as shown in FIG. 9, i.e., in a stepwise monotonic progression of strip widths.

The probability that a light ray traveling within a light duct, and encountering a controlled output panel, passes through a gap or space between the reflective strips is proportional to the local percent open area associated with the reflective strips, which in turn depends on the width, number, and packing density or spacing of reflective strips. And as we saw in connection with the tapered reflective strip pattern and the stepwise monotonic progression, the rate at which light is extracted from the light duct can be controlled by adjusting this percent open area. Here, with the aid of FIG. 10, we provide a more methodical and detailed explanation and description of how the widths, spacings, and number of reflective strips can be tailored to provide a desired open area fraction for a film stack and/or a controlled output panel for a light duct. The discussion is presented in the context of a film stack in which each of the reflective strips, and each gap between adjacent reflective strips, has a uniform width along its length, but the reader will understand that these teachings can be readily applied to film stacks in which the strip and gap width changes along their lengths.

Figure 10:
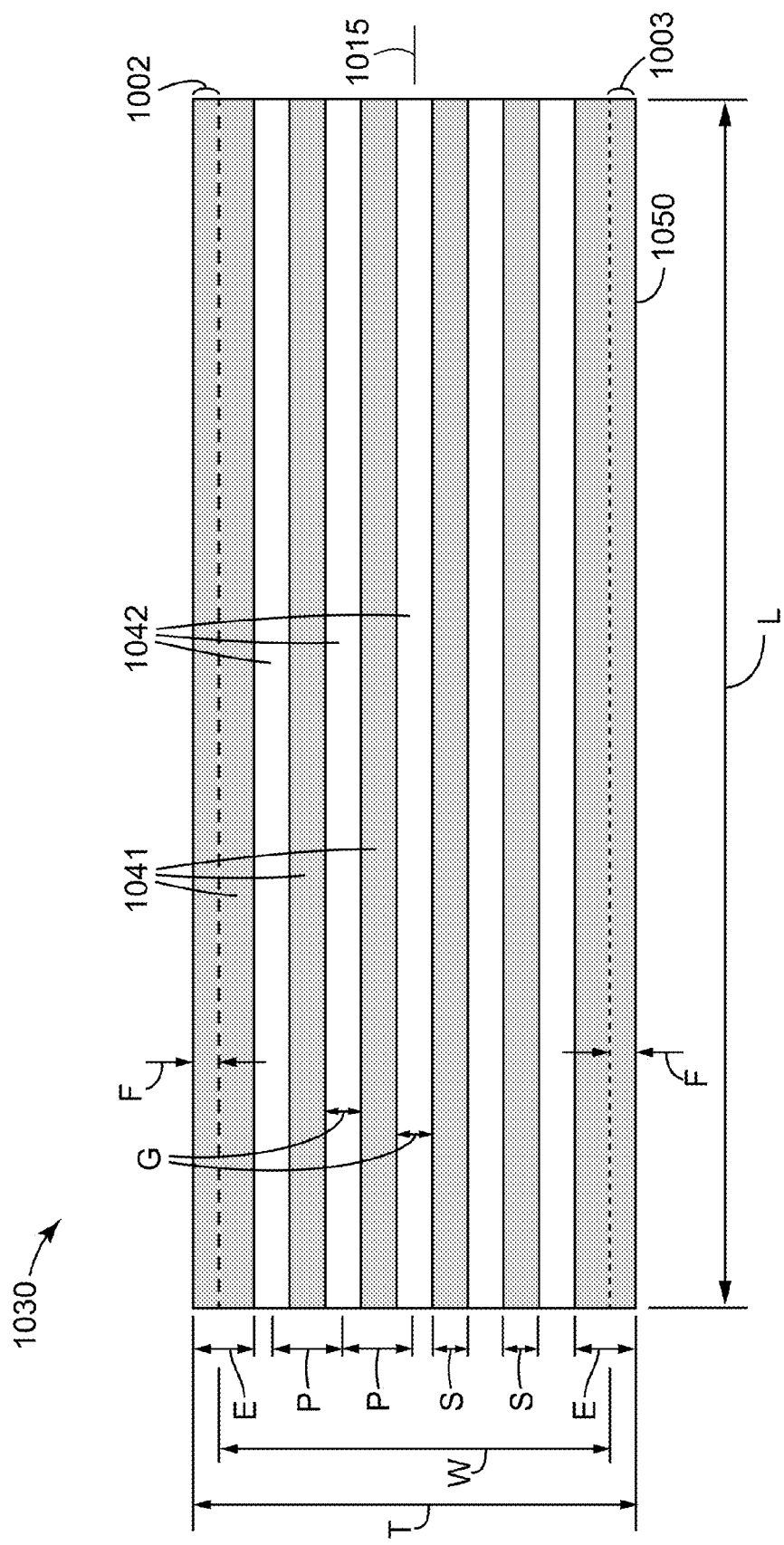
FIG. 10 is a schematic plan view of a film stack that includes a plurality of reflective strips.

Thus, in FIG. 10, a film stack 1030 is provided with a plurality of reflective strips 1041 adhered to a structured optical film 1050 with a discontinuous adhesive layer, and optionally with other films, surfaces, and components as discussed elsewhere herein. FIG. 10 shows a front schematic view of the stack 1030, with the reflective strips facing forward. The film stack 1030 and its constituent components may be the same as or similar to other film stacks and components discussed herein, except as otherwise noted.

The film stack 1030 and the optical film 1050 are generally rectangular in this plan view, with a length L and a width T. A central longitudinal axis 1015 of this rectangular shape may coincide with a down-web direction of the optical film 1050, and/or it may be parallel to a longitudinal axis of a light duct in which the film stack 1030 is mounted. Also, narrow edge portions 1002, 1003 of the stack 1030 may be reserved for mounting flanges with which to support the film stack. These edge portions, which may be obstructed and shielded from view (and hence inoperative or inactive from an optical standpoint) on at least one side of the film stack by opaque (e.g. metallic) mounting flanges, are assumed for simplicity to have a width F and extend along the full length L of the film stack 1030, although other configurations of the edge portions and mounting flanges are also contemplated. Due to the presence of the edge portions, in some cases, it may be desirable to widen the two reflective strips 1041 that are disposed at such edges by a corresponding amount (F), relative to other reflective strips 1041 disposed at more central portions of the film stack.

Also as a result of the edge portions 1002, 1003, we can define an overall active width W for the film stack 1030. The active width W differs from the physical width T by two times the distance F, i.e., W=T−2F. For purposes of this analysis we assume the gaps 1042 between reflective strips 1041 are of equal width G, and this width is also uniform along the length of each gap. We also assume each gap is centered at a particular centerline, and the centerlines of the gaps are uniformly spaced by a distance or pitch P. In our analysis, as we change the gap width G, we assume each gap remains centered on its original centerline. By fixing the centerlines of the gaps in this way (which also fixes the centerlines of the intervening reflective strips), a more uniform or continuous appearance is produced when two films stacks of different gap widths (and different open area fraction) are placed end-to-end.

The reflective strips 1041 are assumed to each have a width S, except for the two reflective strips 1041 at the edge of the stack 1030, which have a width E as shown. In the embodiment of FIG. 10 there are five gaps 1042, but we may generalize this in our analysis to a number N, where the number of gaps N may be 5, or less than 5, or more than 5. The pitch P of the gaps is related to the active width W and the number of gaps N between reflective strips by the relationship:

$$P = W/N.$$

The gap width G is related to an open area fraction X of the active area, and the pitch P of the gaps, by the relationship:

$$G = XP.$$

The open area fraction X is the fraction of the active area occupied by gaps 1042. For a film stack with N gaps 1042 there are N+1 total reflective strips 1041, and there are N−1 reflective strips 1041 excluding the two outermost reflective strips 1041. The reflective strip width S can be expressed as:

$$S = (1-X)P.$$

The width E of the two outermost reflective strips can be expressed as:

$$E = (T-W+S)/2.$$

We may use these relationships to explore the design space of some specific but non-limiting film stacks. In a first case, we assume F=0.25 inches, T=6.1 inches, and N=5. These values yield a value for the active width W of 5.6 inches, and a value for the gap pitch P of 1.120 inches. As we select different values for the open area fraction X, the other parameters take on the values shown in Table 1:

TABLE 1

Dimensions for 5-Gap Pattern vs. Open Area Fraction X

| X | 80% | 70% | 60% | 50% | 40% | 30% | 20% | 10% |
|---|---|---|---|---|---|---|---|---|
| G (in.) | 0.896 | 0.784 | 0.672 | 0.560 | 0.448 | 0.336 | 0.224 | 0.112 |
| S (in.) | 0.224 | 0.336 | 0.448 | 0.560 | 0.672 | 0.784 | 0.896 | 1.008 |
| E (in.) | 0.362 | 0.418 | 0.474 | 0.530 | 0.586 | 0.642 | 0.698 | 0.754 |

Table 1 shows the dimensions of the gap width G, reflective strip width S (interior strips), and reflective strip width E (outer edge strips) for values of the open area fraction ranging from 80% to 10%. The reader will understand the embodiments are also contemplated for other open area fractions, e.g., for X<10% and for X>80%.

In a second case, we can use the above relationships to explore the design space of an embodiment in which F=0.25 inches, T=6.1 inches, and N=7. These values yield a value for the active width W of 5.6 inches, and a value for the gap pitch P of 0.8 inches. As we select different values for the open area fraction X, the other parameters take on the values shown in Table 2:

TABLE 2

Dimensions for 7-Gap Pattern vs. Open Area Fraction X

| X | 80% | 70% | 60% | 50% | 40% | 30% | 20% | 10% |
|---|---|---|---|---|---|---|---|---|
| G (in.) | 0.640 | 0.560 | 0.480 | 0.400 | 0.320 | 0.240 | 0.160 | 0.080 |
| S (in.) | 0.160 | 0.240 | 0.320 | 0.400 | 0.480 | 0.560 | 0.640 | 0.720 |
| E (in.) | 0.330 | 0.370 | 0.410 | 0.450 | 0.490 | 0.530 | 0.570 | 0.610 |

As suggested elsewhere, alternative embodiments can utilize reflective strips of different widths, and reflective strips that are not evenly spaced. Numerous different configurations and patterns can be produced by changing the size and placement of the reflective strips. Such patterns may be symmetric about the centerline of the duct or film stack, or they may be asymmetric about such centerline. To produce a variety of different open area fractions, patterns can be used that employ different reflective strip widths, and/or different numbers of reflective strips or gaps. Different open area fractions in different sections of a given light duct can be realized through subtle changes to a base pattern, e.g. as shown above in Tables 1 and 2, or with dramatically different patterns. Some practical manufacturing limitations may involve a lower limit on the widths of the reflective strips and adhesive areas that can be easily handled in the assembly process, and how accurately the respective layers and strips can be aligned with each other in the stack.

Other films, layers, and components can be included in the disclosed film stacks in addition to those discussed above. Such other components can include blockout strips. As the name suggests, blockout strips serve the function of blocking light. They may achieve this function by being composed of a material or structure that absorbs, reflects, and/or scatters at least some types of light. One reason blockout strips may be included in a film stack is in cases where the reflective strips transmit some light and such transmission of light is deemed undesirable. For example, in some cases, the 3M™ ESR film discussed above, even though it has very high specular reflectivity across the visible light spectrum, transmits some light at high incidence angles, and the transmission at such angles can have a substantial wavelength dependence such that the transmitted light appears colored. We have observed that when film stacks made using the 3M™ ESR film as the reflective strips are used as controlled output panels for a light duct, with the front of the film stack facing the cavity of the light duct and the back of the film stack facing a room to be illuminated, the reflective strips, although much darker in appearance than the brightly illuminated gaps between the reflective strips, have a greenish color when viewed at glancing angles from within the room. To eliminate this greenish color, blockout strips can be added to the film stack. The blockout strips can have a one-to-one correspondence with the reflective strips and can be substantially coextensive with the reflective strips so as to block any light transmitted by the reflective strips while not substantially encroaching upon the light-transmitting spaces or gaps between the reflective strips. Alternatively, in some cases, it may be desirable from a functional and/or aesthetic standpoint for the blockout strips to not have a one-to-one correspondence with the reflective strips, e.g., more or fewer blockout strips may be provided relative to the reflective strips, and one or more of the blockout strips may not be coextensive with, and may not be in registration with, its or their corresponding reflective strips.

The blockout strips may be included in the disclosed film stacks in a variety of places. Some of these places are shown in the schematic side or cross-sectional view of FIG. 11. In this figure, a film stack 1130 includes reflective strips 1141 with spaces or gaps 1142 therebetween, a turning film 1150, a steering film 1151, a light-transmissive plate 1192, and adhesive layers 1180 (which is a discontinuous adhesive layer, with adhesive areas 1182 and open areas 1184), 1185 (also a discontinuous adhesive layer, with adhesive areas 1186 and open areas 1188), and 1190. These elements may be the same as or similar to corresponding elements of the film stack 330 in FIG. 3 or the film stack 430 in FIG. 4. Also similar to FIGS. 3 and 4, the film stack 1130 is shown in the context of a local Cartesian x-y-z coordinate system, which may be the same as or similar to those in FIGS. 3 and 4.

Figure 11:
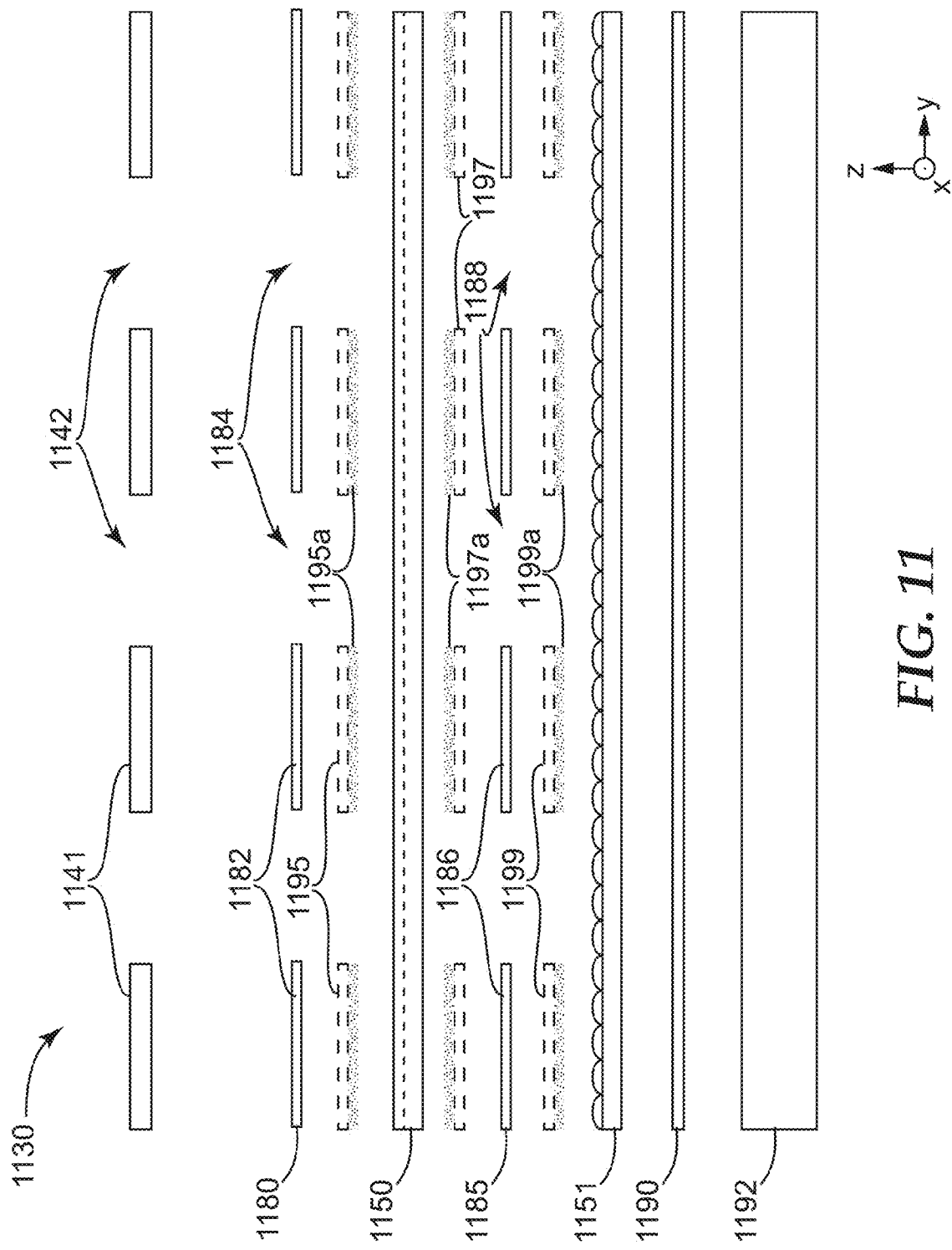
FIG. 11 is a schematic side view of film stack similar to that of FIG. 3 but also including blockout strips that block or obstruct light transmitted by the reflective strips.

The film stack 1130 includes blockout strips in registration with and coextensive with the reflective strips 1141 so as to block any light transmitted by the reflective strips while not obstructing any substantial portion of the spaces or gaps 1142. Three sets of blockout strips are shown in FIG. 11 to demonstrate three alternative positions for them in the film stack. In a first set, block out strips 1195 are disposed between the discontinuous adhesive layer 1180 and the turning film 1150. In a second first set, block out strips 1197 are disposed between the turning film 1150 and the discontinuous adhesive layer 1185. In a third set, block out strips 1199 are disposed between the discontinuous adhesive layer 1185 and the steering film 1151. To minimize cost and complexity of the product, only one of the three depicted sets of blockout strips may be included in the film stack 1130, while in other possible embodiments, two of the three sets may be included, or all three of the sets may be included.

The blockout strips are shown as having a layer of adhesive material applied to one side thereof to ensure overall cohesiveness of the stack 1130. Thus, blockout strips 1195 have adhesive layers 1195a, blockout strips 1197 have adhesive layers 1197a, and blockout strips 1199 have adhesive layers 1199a. The adhesive used with the blockout strips may be the same as or similar to any of the adhesive materials discussed above.

The blockout strips themselves may be made of any suitable absorptive, reflective, or light-scattering material or structure, e.g., a polymer film containing suitable dye(s) and/or pigment(s), or a polymer film printed with ink. In some cases, each blockout strip may have different appearances or optical properties on its opposed major surfaces. For example, 3M™ Blockout Film (e.g. product code 3635-20b or 3635-22b), available from 3M Company, which may be suitable for use as blockout strips in the disclosed film stacks, is black on one side and white on the opposite side. Blockout strips such as these may introduce another degree of freedom into the design of the film stack 1130, namely, the selection of which side of the blockout strip faces the back (or front) of the film stack. When the film stack 1130 is used as a controlled output panel for a light duct, the side of the blockout film that faces the back of the film stack will typically be visible to a user, e.g., a user who is occupying the room in which the light duct is mounted. In this regard, the blockout film may be particularly visible when the light source of the light duct is turned "off", i.e., when other sources of light provide ambient light that illuminate the back side of the film stack. Depending on the type of appearance deemed most desirable, the blockout film may be placed in the film stack in one orientation, with a first (e.g. white) side thereof facing the back of the stack, or in an opposite orientation, with a second (e.g. black) side thereof facing the back of the stack.

In some cases, the blockout strips can be functionally combined with other components of the film stack. For example, rather than (or in addition to) including the blockout strips 1195 in the film stack 1130, the adhesive areas 1182 of the discontinuous adhesive layer 1180 may instead comprise an adhesive material that also includes one or more dyes, pigments, or other materials, such that the adhesive areas 1182 absorb, reflect, scatter, or otherwise block light, and function also as blockout strips. Similarly, rather than (or in addition to) including the blockout strips 1197 or 1199 in the film stack 1130, the adhesive areas 1186 of the discontinuous adhesive layer 1185 may instead comprise an adhesive material that also includes one or more dyes, pigments, or other materials, such that the adhesive areas 1186 absorb, reflect, scatter, or otherwise block light, and function also as blockout strips.

Examples

Figure 14:
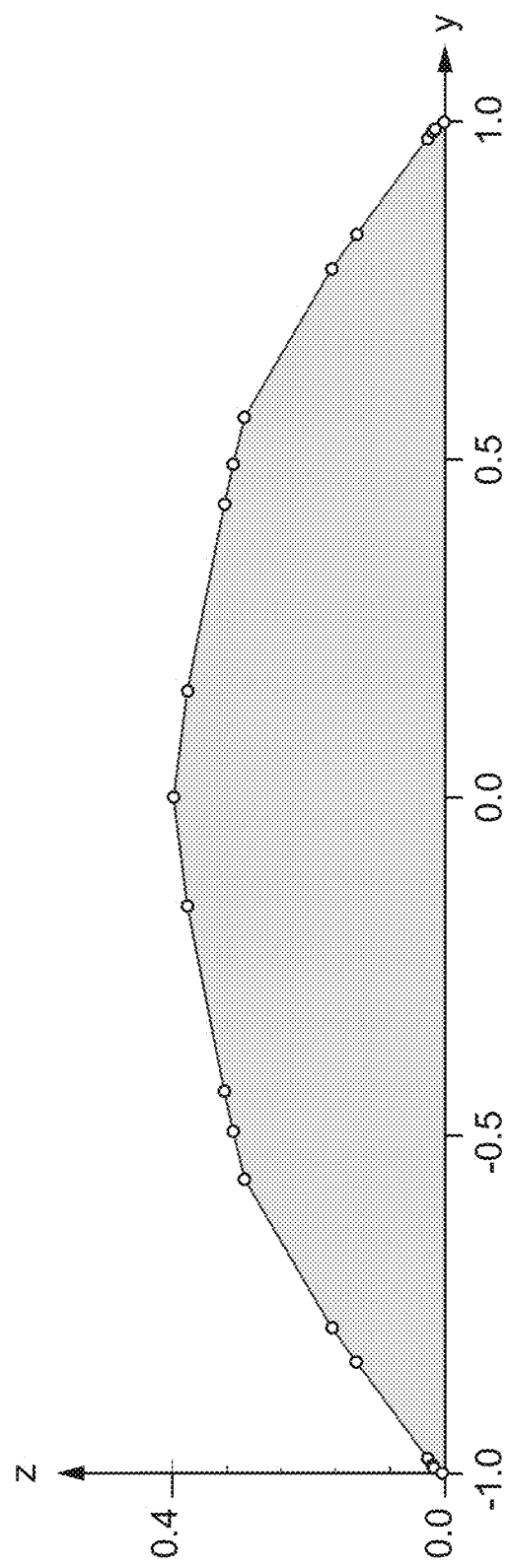
FIG. 14 is a scaled cross-sectional profile of the shape of a linear microstructure in the steering film that was used in the examples.

The foregoing principles were used to fabricate several film stacks and lighting systems having one or more of the features and characteristics discussed above. The fabricated film stacks used one or more of the following specific materials or components:

for the reflective strips: strips made by slitting a stock roll of multilayer optical film, the multilayer optical film having the optical characteristics of 3M™ ESR film (including greater than 98% specular reflectivity across the visible light spectrum, with no more than 2 percent of the reflected light directed more than 0.5 degrees from the specular direction); each strip also includes a pressure sensitive adhesive material applied to one entire major surface of the strip, the pressure sensitive adhesive serving as adhesive areas of a discontinuous adhesive layer in the final construction;

for the turning film: a 2-layer film in which a UV-cured high index resin layer rests atop a polyethylene terephthalate (PET) carrier film, with the high index resin providing a structured surface of linear prisms of prism angle 69 degrees, prism height 37 microns, prism pitch 50 microns, and refractive index 1.54;

for the steering film: a 2-layer film in which a UV-cured high index resin layer rests atop a polyethylene terephthalate (PET) carrier film, with the high index resin providing a structured surface of linear microstructures having a microstructure pitch of 50 microns, a microstructure height of 10 microns, a refractive index of 1.54, and where a cross-sectional profile of each microstructure is shown in FIG. 14 in arbitrary but scaled units (the dots in the figure mark places where the slope of the profile changes);

for the light-transmissive plate, a single layer of polycarbonate, 2.3 mm thick, with in-plane dimensions of 155 mm width and a length of 1198 mm or 381 mm as described below;

for the discontinuous adhesive layer disposed between the turning film and the steering film: Scotch® ATG Adhesive Transfer Tape 924, available from 3M Company, which is an acrylic pressure sensitive adhesive, 0.25 inches (0.64 cm) in width, this adhesive transmitting some light but not being optically clear;

for the continuous adhesive layer that attaches the flat side of the steering film to the light-transmissive plate: 3M™ 8142 Optically Clear Adhesive; and for the light source assembly/light engine: a 9 by 9 array of CREE XM-L2 LEDs (each such LED emitting white light) confined to an area slightly less than 2 inches (5 cm) by 2 inches (5 cm) square, the LED array located at the input end of a collimating horn (truncated pyramid), the input end of the horn being 2 inches (5 cm) by 2 inches (5 cm) in size and the output end being 6 inches (15 cm) by 6 inches (15 cm) in size, the length of the horn being 24 inches (61 cm), the horn being made from 0.020 inch (0.51 mm) thick aluminum sheet metal lined with 3M™ ESR film, or with a multilayer optical film substantially similar to 3M™ ESR film with substantially similar optical properties, the LED array/horn combination producing a partially collimated beam of white light having a half angle (see $\theta_0$ in FIG. 2A) of 20 degrees; and for blockout strips: 3M™ Blockout Film from 3M Company, product code 3635-20b (pressure sensitive adhesive applied to white side of product) and product code 3635-22b (pressure sensitive adhesive applied to black side of product).

First Film Stack.

A first film stack was made in the following way. The steering film was laminated to the polycarbonate plate (2.3 mm thickness, 155 mm width, 381 mm length) using the continuous adhesive layer (8142 Optically Clear Adhesive), with the flat, smooth major surface of the steering film facing the plate and the structured major surface of the steering film exposed to air. Next, the turning film was laminated to the steering film using several parallel, ¼-inch wide strips of the Scotch® ATG Adhesive Transfer Tape 924. Each of these adhesive strips contacted the structured major surface of the steering film on one side, and contacted the flat, smooth major surface of the turning film on the other side. The steering film and the turning film had a relative orientation such that the microstructures of the steering film were elongated parallel to a first axis and the microstructures of the turning film were oriented parallel to a second axis, and the first and second axes were substantially orthogonal, see e.g. FIG. 3, and each of the adhesive strips was substantially parallel to the first axis. Several of the pressure sensitive adhesive-backed reflective strips were then adhered to the exposed structured surface of the turning film, each reflective strip being 0.5 inches (1.3 cm) in width, and having a centerline substantially coincident (in plan view) with the centerline of an associated one of the Scotch® ATG Adhesive Transfer Tape adhesive strips. The lengths of some of the components were deliberately shortened so that some of the components of the film stack could be more easily viewed and distinguished from each other at one end of the stack. (In most other film stacks intended for use in light ducts, substantially all of the optical films and strips in the film stack have the same length, i.e., their dimensions parallel to a longitudinal axis or centerline of the film stack are the same, and at a proximal end of the longitudinal axis, the films and strips have proximal terminal edges that line up or coincide with each other, while at an opposite distal end of the longitudinal axis, the films and strips have distal terminal edges that line up or coincide with each other.)

Figure 12A:
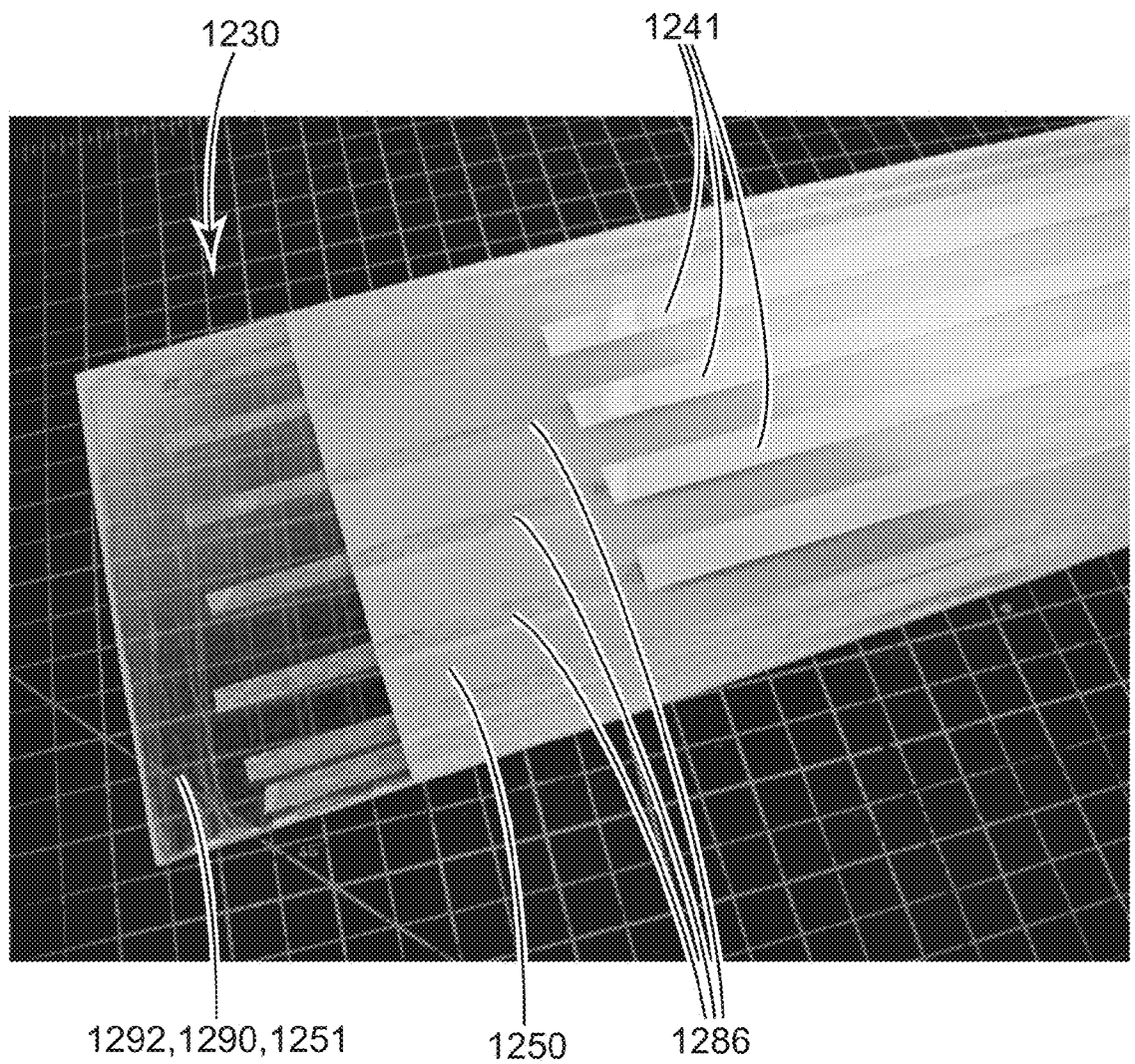
FIG. 12A is a photograph of a film stack that was constructed, where some of its constituent components have been truncated in order to more clearly identify and distinguish the different components.

A photograph of that end of the resulting First Film Stack 1230, as viewed from the front of the stack, is shown in FIG. 12A. In that figure, reference numbers 1292, 1290, and 1251 refer to the light-transmissive plate, the continuous adhesive layer, and the steering film respectively, laminated together. Reference number 1250 refers to the turning film. Reference number 1286 refers to the adhesive areas (adhesive strips) of the discontinuous adhesive layer that attaches the turning film to the steering film. Reference number 1241 refers to the reflective strips.

Second Film Stack.

Figure 12B:
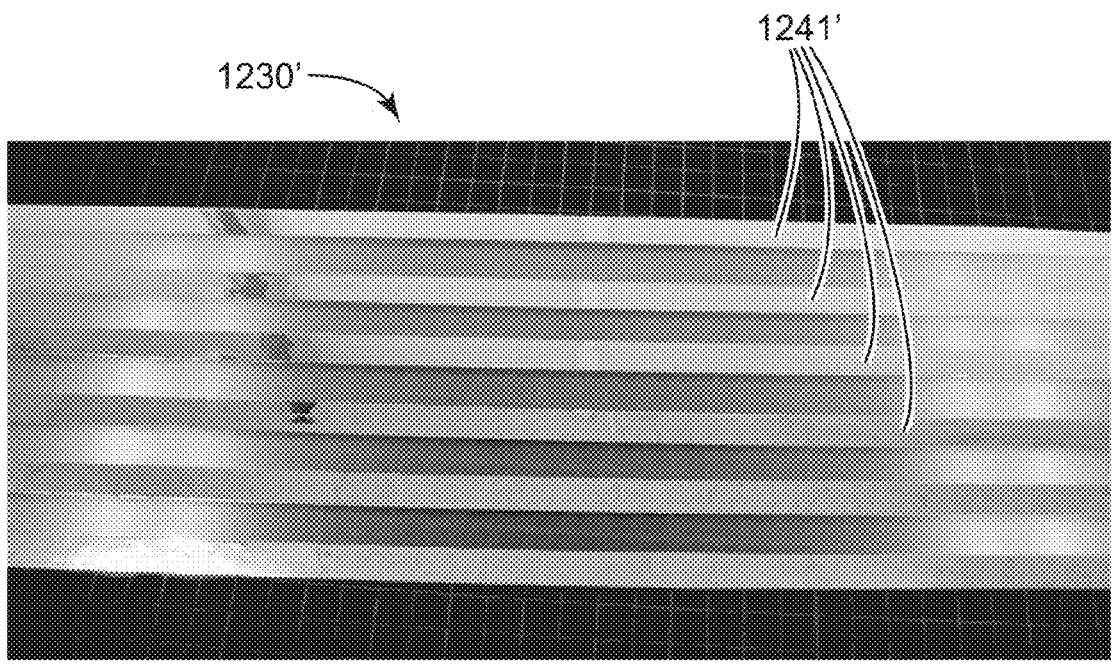
FIGS. 12B and 12C are photographs of a film stack associated with that of FIG. 12A.
Figure 12C:
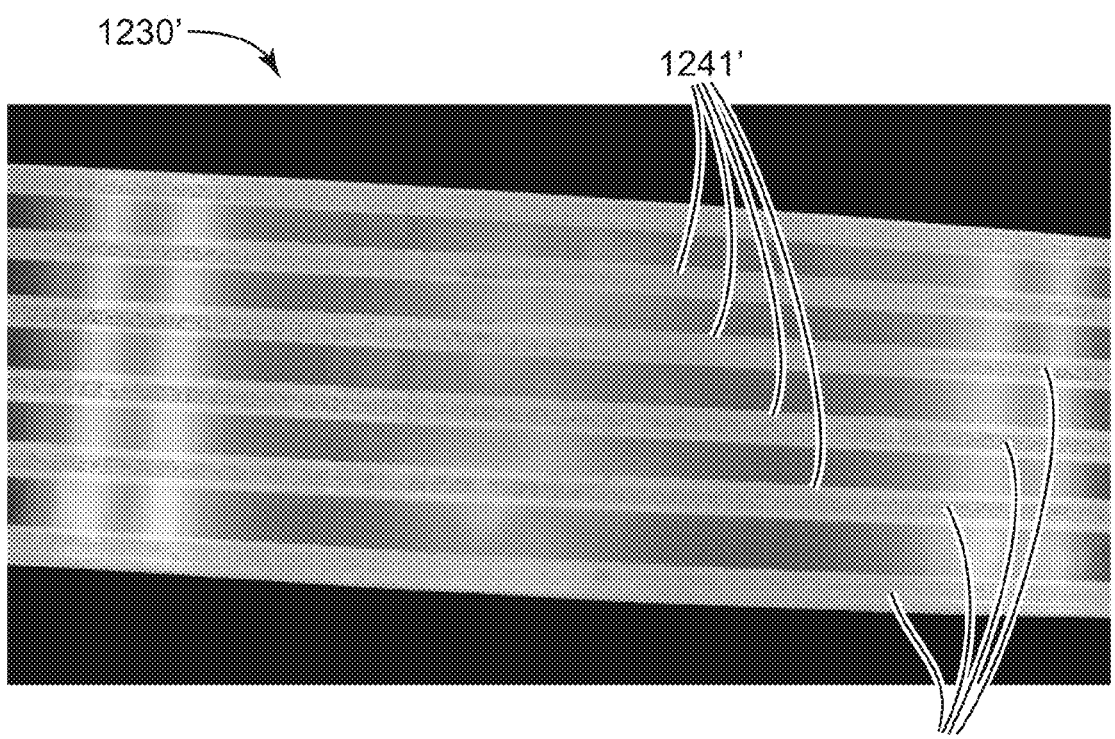

A second film stack was made in substantially the same way as the First Film Stack, except: the polycarbonate plate had a length of 1198 mm rather than 381 mm; and none of the components of the stack were shortened relative to the 1198 mm length of the plate. A photograph of the front of the resulting Second Film Stack, labeled 1230', is shown in FIG. 12B, and a photograph of the back of the Second Film Stack 1230' is shown in FIG. 12C. In these figures, reference number 1241' refers to the reflective strips, and reference number 1286' refers to the adhesive areas (adhesive strips) of the discontinuous adhesive layer that attaches the turning film to the steering film. Note that this Second Film Stack used six reflective strips 1241' and five spaces or gaps therebetween. The two reflective strips 1241' at the outer edges of the stack 1230' had the same width as the remaining four reflective strips 1241'.

First Light Duct.

Figure 12D:
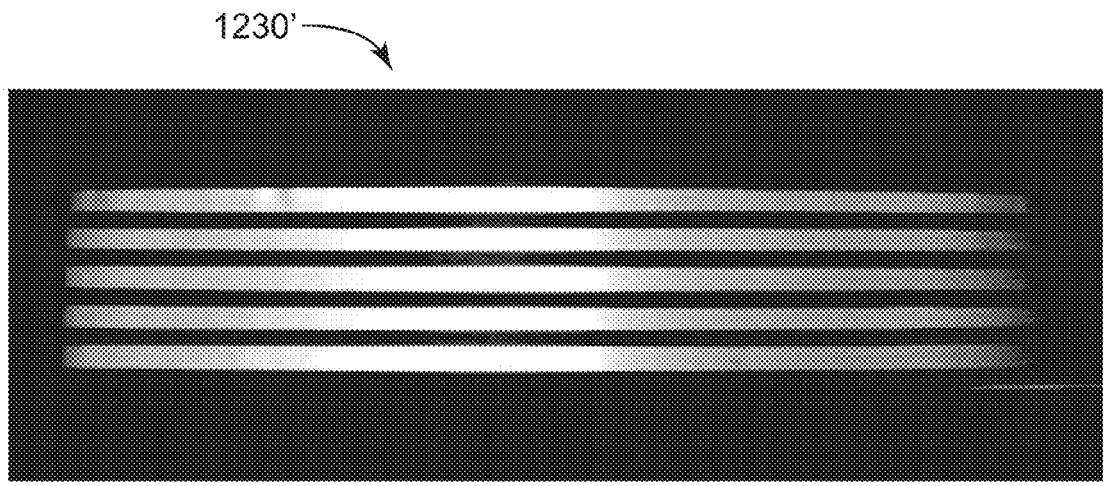
FIGS. 12D and 12E are photographs of a lighting system in which the film stack of FIGS. 12B, 12C is used as a controlled output panel of a light duct.

A first light duct was made using the Second Film Stack 1230' as a controlled output panel. The light duct had a square cross-sectional shape (see e.g. FIG. 2D), the dimension of each side of the square being 6.1 inches (155 mm). The length of the light duct was about 1198 mm. Three of the four walls of the light duct were made of 0.020 inch (0.51 mm) thick aluminum sheet metal that was completely covered on its inside surface with 3M™ ESR film, or with a multilayer optical film substantially similar to 3M™ ESR film with substantially similar optical properties. The remaining wall of the light duct was the Second Film Stack 1230', the front of which faced the cavity of the duct. The light source assembly described above, with its 9 by 9 array of LEDs and collimating horn, was placed at one end of this First Light Duct, and the duct and light source assembly were mounted on the ceiling, with the back side of the Second Film Stack facing downwards towards the floor. FIG. 12D is a photograph of the First Light Duct taken from below the Second Film Stack. The five bright bands that run along the length of the duct correspond to the spaces or gaps between the reflective strips, through which light exits the duct. The dark bands which separate the bright bands correspond to the reflective strips, which transmit very little light along the viewing direction of the photograph.

Figure 12E:
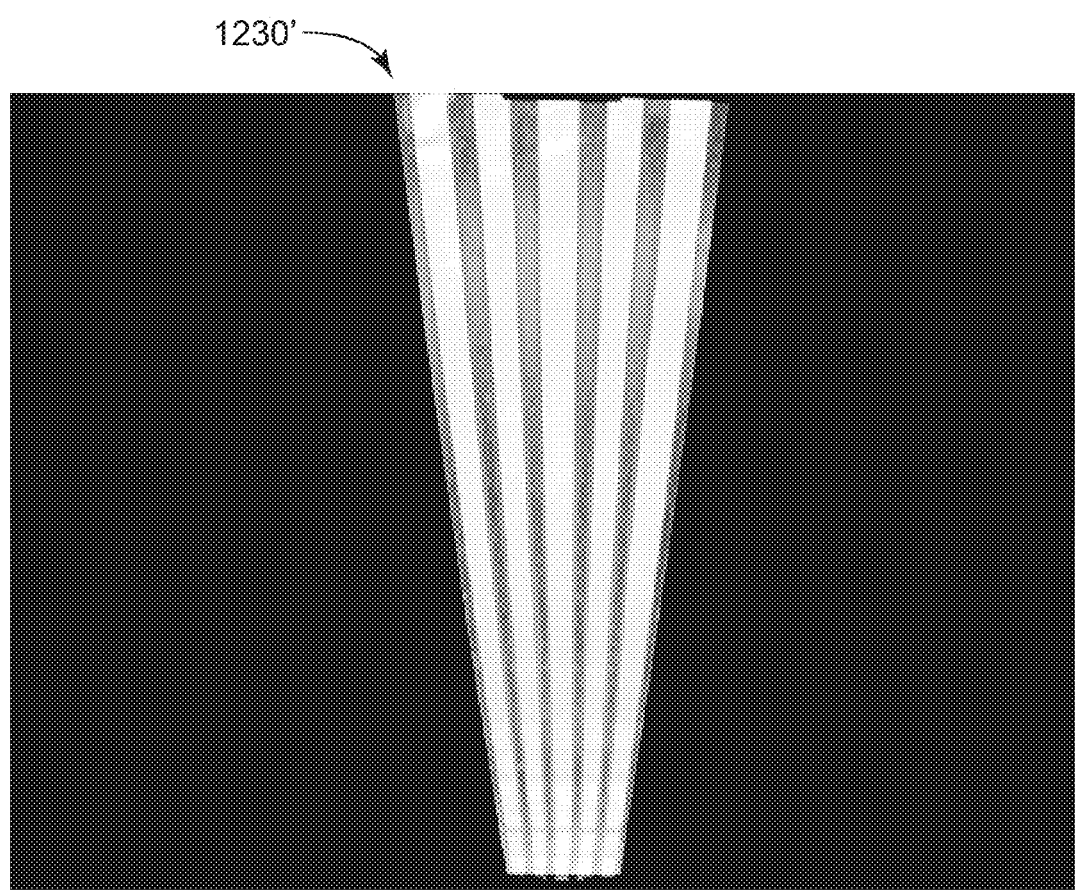

FIG. 12E is a photograph of the same First Light Duct, but it is taken at a more glancing angle to the plane of the Second Film Stack 1230'. Along this viewing direction, the reflective strips transmit significantly more light than in the viewing geometry of FIG. 12D, as can be appreciated by the lighter grayscale appearance of the reflective strips, although they are still much dimmer than the bright bands between the strips. It cannot be seen from the grayscale image, but the light that is transmitted through the reflected strips at the angle of FIG. 12E has a greenish color.

Third Film Stack.

Figure 13A:
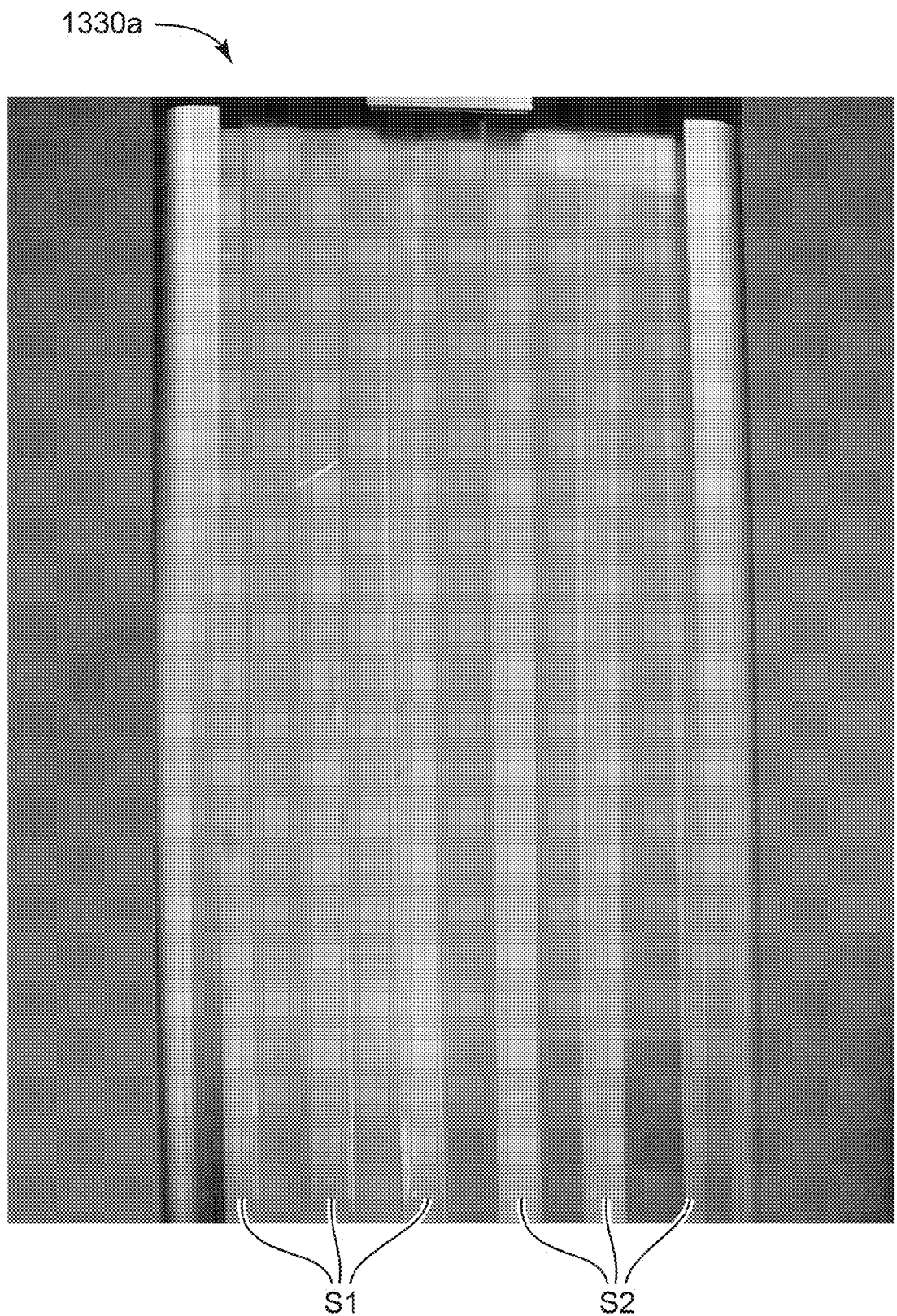
FIG. 13A is a photograph of a controlled output panel of a light duct that incorporates blockout strips for some of the reflective strips in the film stack, with no light being injected into the light duct (daytime appearance)

A third film stack was constructed in substantially the same way as the Second Film Stack, except that blockout strips were added along some of the reflective strips. In particular, for each of three of the reflective strips, a blockout strip of substantially the same length and width as its corresponding reflective strip was placed between the reflective strip and the structured surface of the turning film (see e.g. blockout strips 1195 in FIG. 11). The three blockout strips had the product code 3635-20b (pressure sensitive adhesive applied to white side of product), and the white side of the three blockout strips faced towards the back of the film stack. A photograph of the resulting Third Film Stack 1330a, taken in ambient light, is shown in FIG. 13A. In that figure, S1 refers to the three reflective strips that had no blockout film applied, and S2 refers to the three reflective strips that had the (white-facing) blockout strips applied.

Fourth Film Stack.

Figure 13B:
FIG. 13B is a photograph of a controlled output panel of another light duct that incorporates variously configured blockout strips for all of the reflective strips in the film stack, also with no light being injected into the light duct (daytime appearance)

A fourth film stack was constructed in substantially the same way as the Third Film Stack, except that one blockout strip was included for each of the six reflective strips, and the blockout strips were in a different orientation from the ones in the Third Film Stack. In particular, for two of the reflective strips, a blockout strip of substantially the same length and width as its corresponding reflective strip was placed between the flat surface of the turning film and the second discontinuous adhesive layer (see e.g. blockout strips 1197 in FIG. 11). These two blockout strips had the product code 3635-20b (pressure sensitive adhesive applied to white side of product), and the black side of the two blockout strips faced towards the back of the film stack. For one of the remaining reflective strips, a blockout strip of substantially the same length and width as its corresponding reflective strip was placed between the second discontinuous adhesive layer and the structured surface of the steering film (see e.g. blockout strips 1199 in FIG. 11). This blockout strip had the product code 3635-22b (pressure sensitive adhesive applied to black side of product), and the black side of this blockout strip faced towards the back of the film stack. For each of the remaining three of the reflective strips, a blockout strip of substantially the same length and width as its corresponding reflective strip was placed between the reflective strip and the structured surface of the turning film (see e.g. blockout strips 1195 in FIG. 11). These three blockout strips had the product code 3635-22b (pressure sensitive adhesive applied to black side of product), and the black side of the three blockout strips faced towards the back of the film stack. A photograph of the resulting Fourth Film Stack 1330b, taken in ambient light, is shown in FIG. 13B. In that figure, S3 refers to the two reflective strips that had the blockout film applied at positions shown by strips 1197 in FIG. 11, S4 refers to the reflective strip that had the blockout film applied at a position shown by strip 1199 in FIG. 11, and S5 refers to the three reflective strips that had the blockout strips applied at positions shown by strips 1195 in FIG. 11.

Second Light Duct.

Figure 13C:
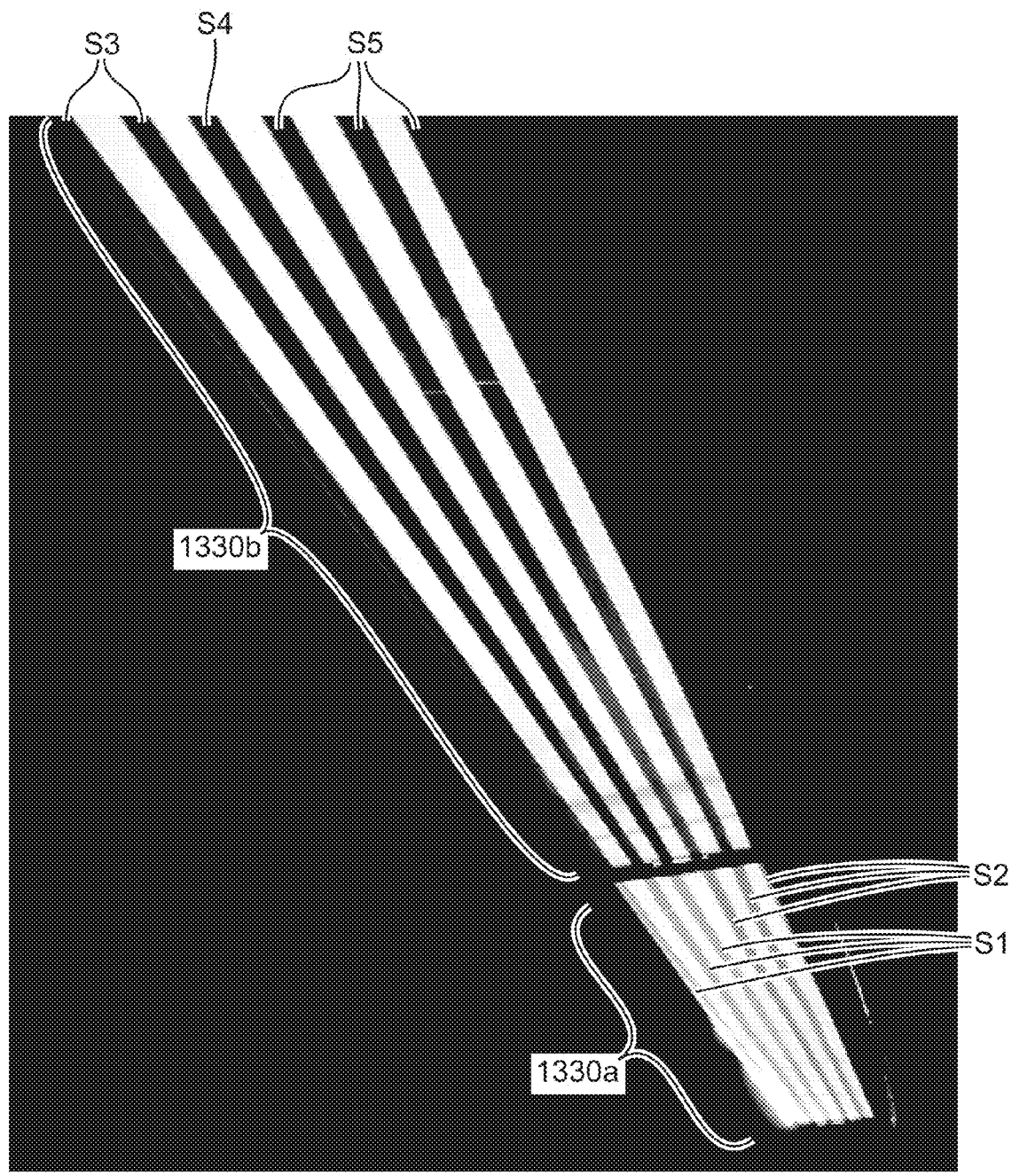
FIG. 13C is a photograph of a lighting system composed of the light ducts of FIGS. 13A and 13B connected together, with a light source disposed at one end to inject light into the combination.

A second light duct was made using the Third Film Stack and Fourth Film Stack as controlled output panels. The Second Light Duct was twice as long as the First Light Duct, and was made in two sections that were connected end-to-end using metal clips described in the 61/918,371 U.S. patent application referenced above. Each of the two sections was substantially the same as the First Light Duct, except that, for one such section, the Third Film Stack 1330a was used as the controlled output panel, and for the other section, the Fourth Film Stack 1330b was used as the controlled output panel. The same light source assembly that was used with the First Light Duct was placed at one end of the Second Light Duct, and at the opposite end of the Second Light Duct a mirrored termination plate (with a 3M™ ESR reflective surface) was attached to reflect any light that reached the end of the duct back into the duct for another pass. The Second Light Duct was mounted to the ceiling, and the light source assembly was turned on. FIG. 13C is a photograph of the Second Light Duct taken from below the Third and Fourth Film Stacks. The Third Film Stack 1330a, the Fourth Film Stack 1330b, and the various strips S1, S2, S3, S4, S5 are all labeled in the figure. From the perspective of this photograph, the light source is located at the far end of the light duct, i.e., at the bottom right of the photograph.

Unless otherwise indicated, all numbers expressing feature sizes, amounts, ranges, limits, and physical and other properties used in the specification and claims are to be understood as being modified in all instances by the term "about". Accordingly, unless indicated to the contrary, the numerical parameters set forth in the specification and claims are approximations that can vary depending on the desired properties sought to be obtained by those skilled in the art utilizing the teachings disclosed herein.

As used in this specification and the appended claims, the singular forms "a," "an," and "the" encompass embodiments having plural referents, unless the context clearly dictates otherwise. As used in this specification and the appended claims, the term "or" is generally employed in its sense including "and/or" unless the context clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

When a given element (including one or more elements, components, layers, or the like) is described as being "on," "connected to," "coupled to," or "attached to" another element (including one or more elements, components, layers, or the like), the given element can be directly on, directly connected to, directly coupled to, or directly attached to such other element, or an intervening element (including one or more elements, components, layers, or the like) may be interposed between the given element and the other element. When the given element is referred to as being "directly on," "directly connected to," "directly coupled to," "directly attached to," or "in contact with" the other element, there are no, or substantially no, intervening elements.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

The invention claimed is:

1. A film stack suitable for use in a light duct, the film stack comprising:
    a structured optical film having opposed first and second major surfaces, at least one of the first and second major surfaces comprising a structured surface comprising linear prisms having a first longitudinal direction;
    a plurality of discontinuous reflective strips attached to the first major surface, each reflective strip comprising first and second major edges and first and second minor edges, the major and minor edges defining a continuous edge circumscribing the reflective strip, and at least some of the major and minor edges having been slit from a film of reflective material, each reflective strip having a length along one of the major edges in a second longitudinal direction different from the first longitudinal direction, the reflective strips being isolated from each other by gaps extending between the reflective strips and extending the length of the reflective strips, wherein the reflective strips are not interconnected;
    a substrate attached to the second major surface;
    a first discontinuous adhesive layer that attaches the plurality of reflective strips to the first major surface, the first discontinuous adhesive layer comprising first adhesive areas and first open areas; and
    a second discontinuous adhesive layer that attaches the substrate to the second major surface, the second discontinuous adhesive layer comprising second adhesive areas and second open areas.

2. The film stack of claim 1, wherein the first adhesive areas have a first collective area in plan view, and wherein at least 80% of the first collective area is circumscribed by the plurality of reflective strips.

3. The film stack of claim 1, wherein the second adhesive areas have a second collective area in plan view, and wherein at least 80% of the second collective area is circumscribed by the plurality of reflective strips.

4. The film stack of claim 1, wherein the first adhesive areas comprise at least one adhesive area for each of the reflective strips.

5. The film stack of claim 1, wherein the first adhesive areas comprise only one given adhesive area for each of the reflective strips.

6. The film stack of claim 5, wherein the one given adhesive area for each reflective strip is strip-shaped and in substantial registration with its associated reflective strip.

7. The film stack of claim 1, wherein the first adhesive areas comprise first adhesive strips which have a one-to-one correspondence with the reflective strips.

8. The film stack of claim 1, wherein the second adhesive areas comprise at least one adhesive area for a majority of the reflective strips.

9. The film stack of claim 8, wherein the second adhesive areas comprise at least one adhesive area for each of the reflective strips.

10. The film stack of claim 1, wherein:
    the linear prisms, when exposed to air, are operative to redirect light; and
    the first discontinuous adhesive layer physically contacts the structured surface of the structured optical film in the first adhesive areas to render the linear prisms substantially inoperative in the first adhesive areas; or
    the second discontinuous adhesive layer physically contacts the structured surface of the structured optical film in the second adhesive areas to render the linear prisms substantially inoperative in the second adhesive areas.

11. The film stack of claim 1, wherein the structured optical film is a first structured optical film and the structured surface is a first structured surface, and wherein the substrate comprises opposed third and fourth major surfaces, at least one of the third and fourth major surfaces comprising a second structured surface.

12. The film stack of claim 11, wherein the third major surface comprises the second structured surface, and the substrate attaches to the second major surface of the first structured optical film via the second structured surface.

13. The film stack of claim 12, wherein the second structured surface comprises surface features which, when exposed to air, are operative to redirect light, and the second discontinuous adhesive layer physically contacts the second structured surface in the second adhesive areas to render the surface features substantially inoperative in the second adhesive areas.

14. The film stack of claim 11, wherein the substrate comprises a light-transmissive plate attached to a second structured optical film, and the third and fourth major surfaces are opposed major surfaces of the second structured optical film.

15. The film stack of claim 1, wherein the reflective strips have an average reflectivity, for normally incident, unpolarized, white light, of at least 80%.

16. The film stack of claim 1, wherein at least one of the reflective strips comprises a multilayer optical film in which a group of microlayers provides reflection or transmission of light as a result of constructive or destructive interference of light.

17. The film stack of claim 1, wherein at least one of the reflective strips comprises a metal-coated polymer film.

18. The film stack of claim 1, wherein the reflective strips transmit some light, the film stack further comprising:
    a plurality of blockout strips, the blockout strips having a one-to-one correspondence with the reflective strips, and each blockout strip being positioned to block light transmitted by its corresponding reflective strip.

19. A light duct comprising the film stack of claim 1 and one or more reflective walls, the film stack and the one or more reflective walls forming a duct.

20. The light duct of claim 19, wherein the light duct has a longitudinal axis, wherein the structured surface of the structured optical film comprises a plurality of parallel linear or elongated microstructures, each microstructure having a vertex, and wherein the vertices of the microstructures are substantially perpendicular to the longitudinal axis of the light duct.

21. The film stack of claim 1, wherein the second longitudinal direction is perpendicular to the first longitudinal direction.

22. The film stack of claim 1, wherein each reflective strip comprises a central portion and a peripheral portion adjacent the continuous edge, and wherein the central portion contacts at least one of the first adhesive areas.

* * * * *